US012681496B2

(12) United States Patent
Chi et al.

(10) Patent No.: US 12,681,496 B2
(45) Date of Patent: Jul. 14, 2026

(54) MOTION CONTROL METHOD, CONTROLLER, AND STORAGE MEDIUM

(71) Applicant: TENCENT TECHNOLOGY (SHENZHEN) COMPANY LIMITED, Shenzhen (CN)

(72) Inventors: Wanchao Chi, Shenzhen (CN); Xinyang Jiang, Shenzhen (CN); Yu Zheng, Shenzhen (CN); Yufeng Zhang, Shenzhen (CN); Lingzhu Xiang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 142 days.

(21) Appl. No.: 18/624,326

(22) Filed: Apr. 2, 2024

(65) Prior Publication Data

US 2024/0248488 A1 Jul. 25, 2024

Related U.S. Application Data

(63) Continuation of application No. PCT/CN2023/092651, filed on May 8, 2023.

(30) Foreign Application Priority Data

Jul. 25, 2022 (CN) .......................... 202210880649.1

(51) Int. Cl.
G05D 1/60 (2024.01)
B62D 57/032 (2006.01)
G05D 109/12 (2024.01)

(52) U.S. Cl.
CPC ............. G05D 1/60 (2024.01); B62D 57/032 (2013.01); *G05D 2109/12* (2024.01)

(58) Field of Classification Search
CPC ..... G05D 1/60; G05D 2109/12; B62D 57/032
(Continued)

(56) References Cited

U.S. PATENT DOCUMENTS 6,484,068 B1 * 11/2002 Yamamoto ........... B62D 57/032
901/1
9,618,937 B1 4/2017 Blankespoor et al.
(Continued)

FOREIGN PATENT DOCUMENTS

CN 108860360 A 11/2018
CN 110815211 A 2/2020
(Continued)

OTHER PUBLICATIONS

English Translation for CN-112114589-A (Year: 2025).*
(Continued)

*Primary Examiner* — Mahmoud S Ismail
(74) *Attorney, Agent, or Firm* — Anova Law Group, PLLC

(57) ABSTRACT

The present disclosure discloses a motion control method and apparatus for a legged robot, a legged robot, a computer-readable storage medium, and a computer program product. The legged robot includes at least two foot-ends. The method includes: receiving a bound instruction for the legged robot in response to the foot-ends of the legged robot standing in unit regions that are independent from one another, the bound instruction being used for instructing the legged robot to bound to a target unit region from at least two unit regions in which the legged robot is currently located; and controlling the legged robot to bound to the target unit region in response to the bound instruction, a distance between any two foot-ends of the legged robot in the target unit region being less than a distance between two corresponding foot-ends before bounding.

19 Claims, 8 Drawing Sheets

(58) Field of Classification Search
USPC ......................................................... 701/23
See application file for complete search history.

(56)                    References Cited

U.S. PATENT DOCUMENTS

| | | | | |
|---|---|---|---|---|
| 10,059,392 | B1 | 8/2018 | Fay et al. | |
| 2005/0151497 | A1* | 7/2005 | Nagasaka | B62D 57/032 318/568.12 |
| 2007/0016329 | A1* | 1/2007 | Herr | A61F 2/70 700/250 |
| 2023/0055206 | A1 | 2/2023 | Zheng et al. | |
| 2023/0182307 | A1* | 6/2023 | Chen | B25J 9/1692 700/254 |
| 2024/0181637 | A1* | 6/2024 | Gillett | B25J 17/00 |
| 2025/0291353 | A1* | 9/2025 | Nguyen | B62D 57/024 |

FOREIGN PATENT DOCUMENTS

| | | | | |
|---|---|---|---|---|
| CN | 111367327 A | | 7/2020 | |
| CN | 111766885 A | | 10/2020 | |
| CN | 111857173 A | | 10/2020 | |
| CN | 112114589 A | * | 12/2020 | B62D 57/032 |
| CN | 112650222 A | | 4/2021 | |
| CN | 114248855 A | | 3/2022 | |

OTHER PUBLICATIONS

The European Patent Office (EPO) The Extended European Search Report for Applicaton No. 23844964.9 Jan. 21, 2025 9 Pages.

Chuong Nguyen et al., "Continuous jumping for legged robots on stepping stones via trajectory optimization and model predictive control." 2022 IEEE 61st Conference on Decision and Control (CDC). IEEE, 2022.

Ruben Grandia et al. "Multi-layered safety for legged robots via control barrier functions and model predictive control." 2021 IEEE International Conference on Robotics and Automation (ICRA). IEEE, 2021.

Ayush Agrawal et al. "Vision-aided dynamic quadrupedal locomotion on discrete terrain using motion libraries." 2022 International Conference on Robotics and Automation (ICRA). IEEE, 2022.

Nguyen, Quan, et al. "3d dynamic walking on stepping stones with control barrier functions." 2016 IEEE 55th Conference on Decision and Control (CDC). IEEE, 2016.

The World Intellectual Property Organization (WIPO) International Search Report for PCT/CN2023/092651 Aug. 7, 2023 6 Pages (including translation).

H.-W. Park et al., "Variable-speed quadrupedal bounding using impulse planning: Untethered high-speed 3D Running of MIT Cheetah 2," 2015 IEEE International Conference on Robotics and Automation (ICRA), 2015, pp. 5163-5170.

G. Bledt et al., "Extracting Legged Locomotion Heuristics with Regularized Predictive Control," 2020 IEEE International Conference on Robotics and Automation (ICRA), 2020, pp. 406-412.

C. Nguyen et al., "Continuous Jumping for Legged Robots on Stepping Stones via Trajectory Optimization and Model Predictive Control," arXiv:2204.01147[cs.RO], 2022.

W. Chi et al., "A Linearization of Centroidal Dynamics for the Model-Predictive Control of Quadruped Robots," 2022 IEEE International Conference on Robotics and Automation (ICRA), 2022.

\* cited by examiner

100

Network 300

Bound instruction

200

Control
program

400

100

Network 300

Bound instruction

Bound instruction

Control
program

200

400

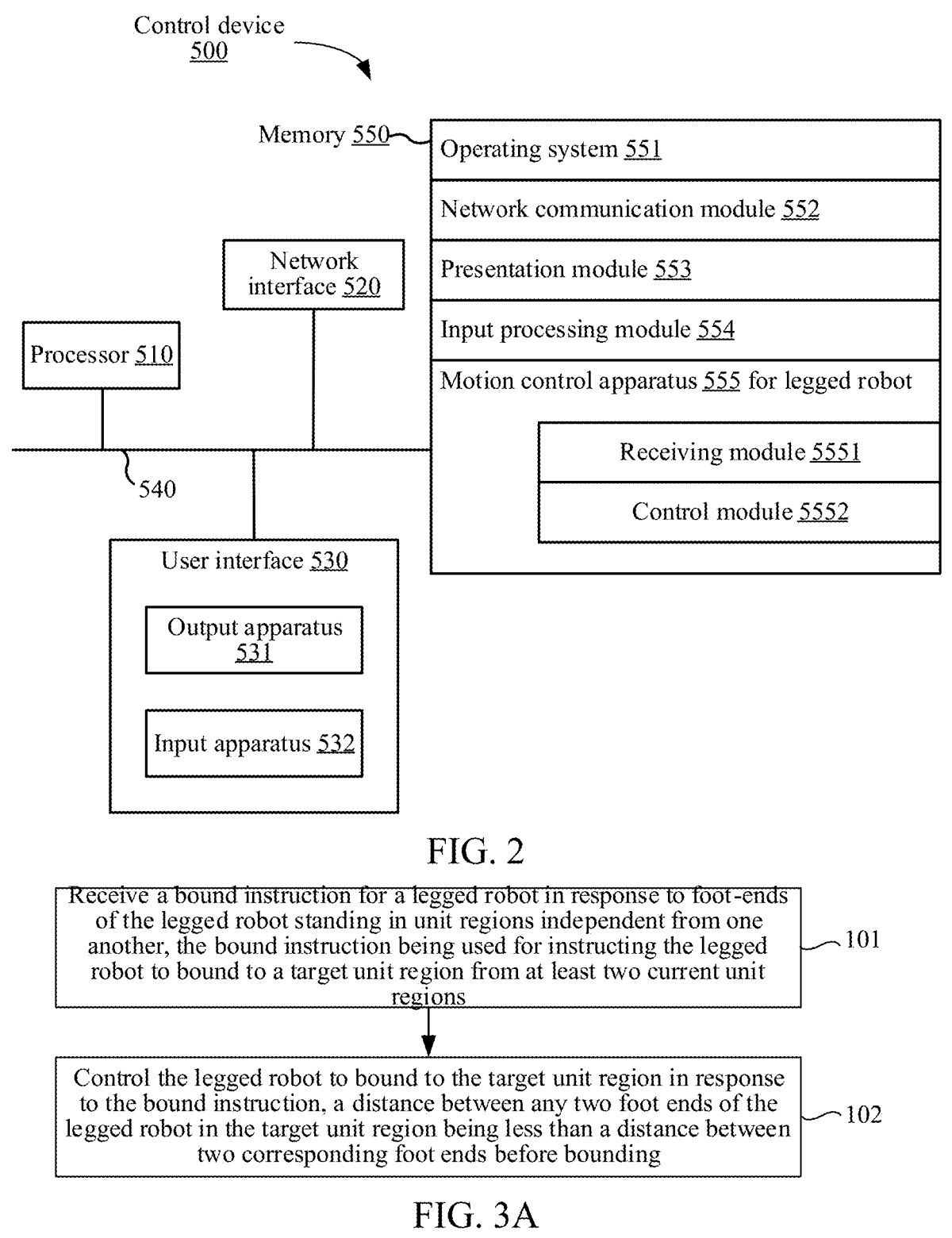

Control device
500

Memory 550

| Operating system 551 |
| Network communication module 552 |
| Presentation module 553 |
| Input processing module 554 |
| Motion control apparatus 555 for legged robot |

Network
interface 520

Processor 510

540

| Receiving module 5551 |
| Control module 5552 |

User interface 530

Output apparatus
531

Input apparatus 532

FIG. 2

Receive a bound instruction for a legged robot in response to foot-ends of the legged robot standing in unit regions independent from one another, the bound instruction being used for instructing the legged robot to bound to a target unit region from at least two current unit regions　　101

Control the legged robot to bound to the target unit region in response to the bound instruction, a distance between any two foot ends of the legged robot in the target unit region being less than a distance between two corresponding foot ends before bounding　　102

FIG. 3A

Receive a bound instruction for a legged robot in response to foot-ends of the legged robot standing in unit regions independent from one another, the bound instruction being used for instructing the legged robot to bound to a target unit region from at least two current unit regions ⌐~101

Control the legged robot to bound to the target unit region in response to the bound instruction, so that the foot-ends of the legged robot converge in the target unit region, and a distance between any two foot ends of the legged robot in the target unit region being less than a distance between two corresponding foot ends before bounding ⌐~102

Control the legged robot to continuously perform at least one of a head shaking action and a fishtailing action in the target unit region based on at least one degree of freedom ⌐~103

FIG. 3B

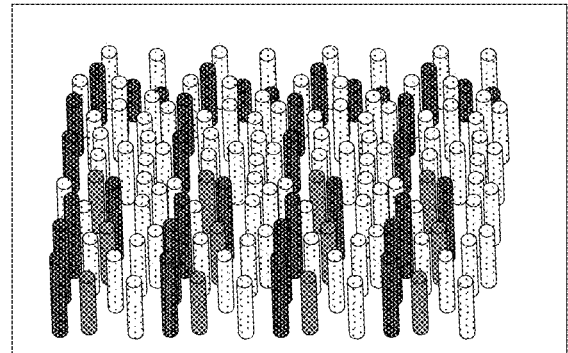

FIG. 4

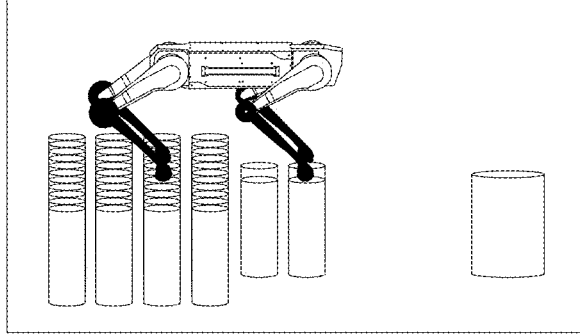

FIG. 5

A legged robot predicts a bound trajectory of the legged robot, to obtain a reference bound trajectory ⌐201

Obtain a constraint condition corresponding to the bound instruction, the constraint condition being used for constraining the bound of the legged robot ⌐202

Determine state parameters of at least two key points in the reference bound trajectory based on the reference bound trajectory and the constraint condition ⌐203

FIG. 6

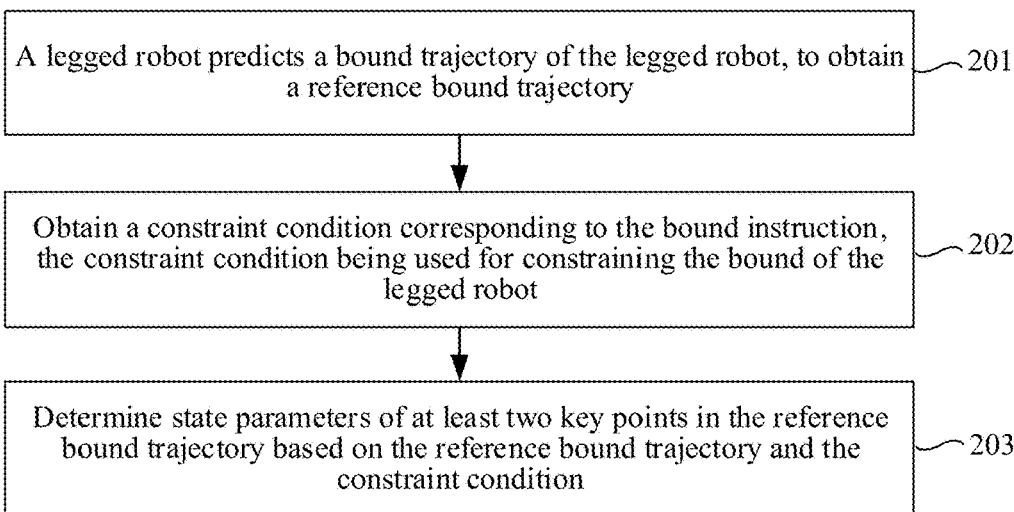
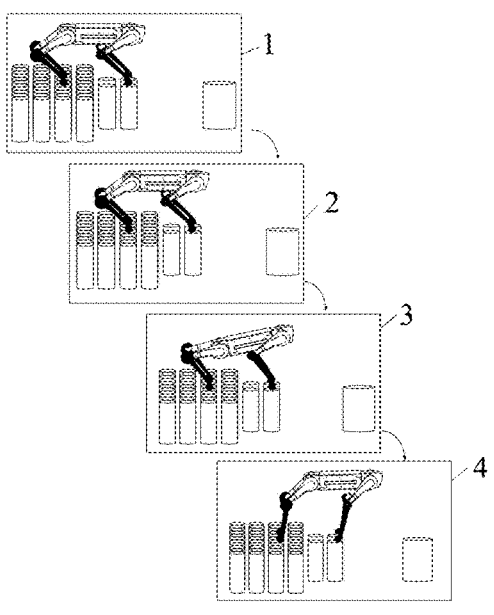

FIG. 7

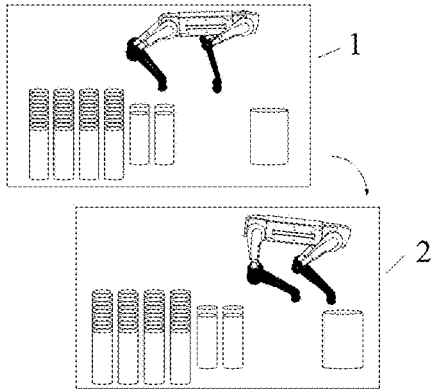

FIG. 8

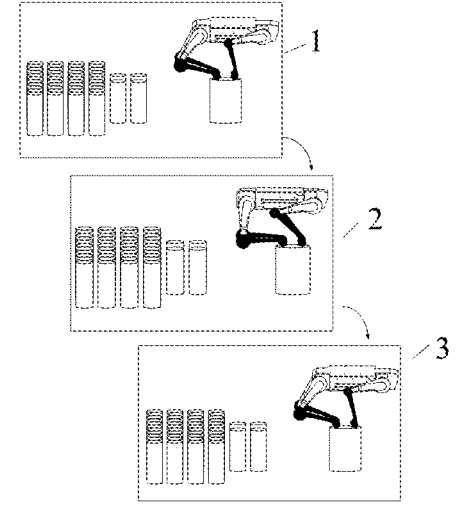

FIG. 9

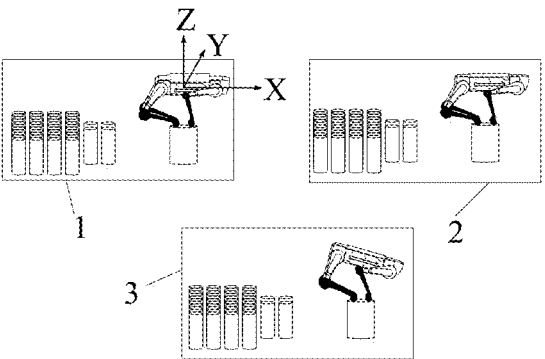

FIG. 10

A legged robot receives a bound instruction for the legged robot in response to foot-ends of the legged robot standing in a same initial unit region and the foot-ends converge in the initial unit region, the bound instruction being used for instructing the legged robot to bound to target unit regions independent from one another from the initial unit region in which the legged robot is currently located    ~ 401

Control the legged robot to bound to the target unit regions in response to the bound instruction    ~ 402

FIG. 11

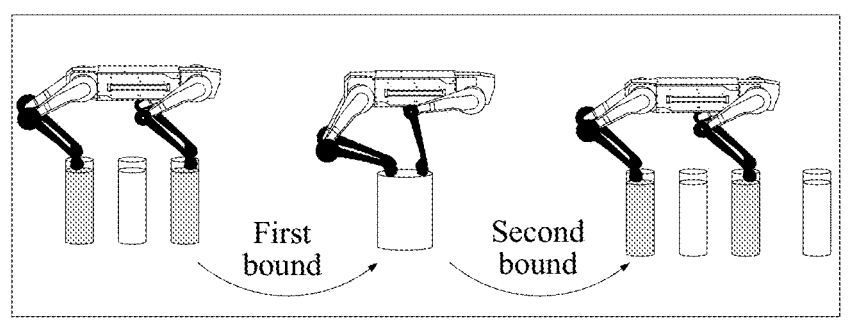
FIG. 15
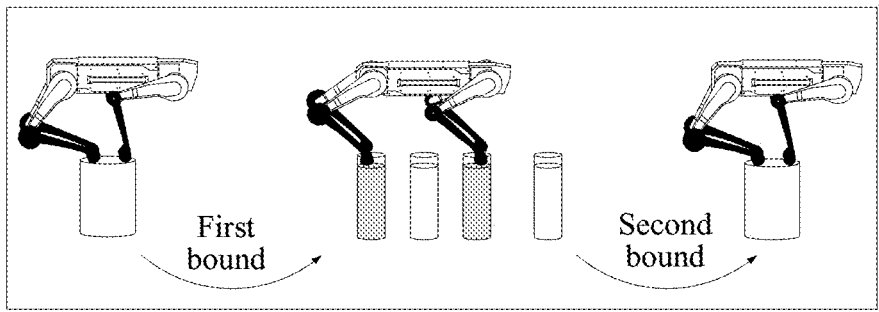
FIG. 16
FIG. 17

MOTION CONTROL METHOD, CONTROLLER, AND STORAGE MEDIUM

CROSS-REFERENCES TO RELATED APPLICATIONS

This application is a continuation application of PCT Patent Application No. PCT/CN2023/092651, filed on May 8, 2023, which claims priority to Chinese Patent Application No. 202210880649.1 filed on Jul. 25, 2022, and claims priority to the Chinese patent application, all of which is incorporated herein by reference in their entirety.

FIELD OF THE TECHNOLOGY

The present disclosure relates to the technical field of robot motion control, and in particular, to a motion control method and apparatus for a legged robot, a legged robot, a computer-readable storage medium, and a computer program product.

BACKGROUND OF THE DISCLOSURE

Legged robots are gaining increasing attention due to their bionic, flexible, and other features. Various gaits of legged robot have been realized, including walking, trotting, cantering, bipedal bounding, quadruped bounding, pacing, galloping, and the like.

However, with respect to bounding gaits of a legged robot, most bounding actions that can be implemented by the legged robot are implemented as motions with continuous gaits on a flat ground or a terrain with a large landing area, which has a low precision of controlling motions of a legged robot.

SUMMARY

An embodiment of the present disclosure provides a motion control method for a legged robot, performed by a control device. The legged robot includes at least two foot-ends. The method includes: receiving a bound instruction for the legged robot in response to the foot-ends of the legged robot standing in unit regions that are independent from one another, the bound instruction being used for instructing the legged robot to bound to a target unit region from at least two unit regions in which the legged robot is currently located; and controlling the legged robot to bound to the target unit region in response to the bound instruction, a distance between any two foot-ends of the legged robot in the target unit region being less than a distance between two corresponding foot-ends before bounding.

Another embodiment of the present disclosure provides a controller for a legged robot. The legged robot includes at least two foot-ends. The controller includes one or more processors; and one or more memories, storing a computer-executable program that, when being executed, causes the one or more processors to perform a motion control method. The method includes receiving a bound instruction for the legged robot in response to the foot-ends of the legged robot standing in unit regions that are independent from one another, the bound instruction being used for instructing the legged robot to bound to a target unit region from at least two unit regions in which the legged robot is currently located; and controlling the legged robot to bound to the target unit region in response to the bound instruction, a distance between any two foot-ends of the legged robot in the target unit region being less than a distance between two corresponding foot-ends before bounding.

Another embodiment of the present disclosure provides non-transitory computer-readable storage medium, storing computer-executable instructions that, when being executed, causes one or more processors to perform a motion control method. The method includes receiving a bound instruction for the legged robot in response to the foot-ends of the legged robot standing in unit regions that are independent from one another, the bound instruction being used for instructing the legged robot to bound to a target unit region from at least two unit regions in which the legged robot is currently located; and controlling the legged robot to bound to the target unit region in response to the bound instruction, a distance between any two foot-ends of the legged robot in the target unit region being less than a distance between two corresponding foot-ends before bounding.

The embodiments of the present disclosure have the following beneficial effects.

According to the embodiments of the present disclosure, based on the received bound instruction, the legged robot may be controlled to bound to the target unit region from the unit regions independent from one another in which the foot-ends of the legged robot stand. Since the distance between any two foot-ends of the legged robot in the target unit region is less than the distance between the two corresponding foot-ends before the bound, it may be learned that the bound performed by the legged robot is limited by the target unit region, that is, a landing point of the legged robot is limited, which implements control of the legged robot when bounding into the limited region, improves a precision of controlling bound of the legged robot, and diversifies motions of the legged robot.

BRIEF DESCRIPTION OF THE DRAWINGS

FIG. 2 is a schematic structural diagram of a control device configured to implement a motion control method for a legged robot according to an embodiment of the present disclosure.

FIG. 3A to FIG. 3B are schematic flowcharts of a motion control method for a legged robot according to an embodiment of the present disclosure.

FIG. 4 is a schematic diagram of a terrain region in the form of a quincuncial pile pattern according to an embodiment of the present disclosure.

FIG. 5 is a schematic diagram of an initial state of a legged robot according to an embodiment of the present disclosure.

FIG. 6 is a schematic flowchart of obtaining a state parameter according to an embodiment of the present disclosure.

FIG. 7 is a schematic diagram of a take-off phase of a legged robot according to an embodiment of the present disclosure.

FIG. 8 is a schematic diagram of a flight phase of a legged robot according to an embodiment of the present disclosure.

FIG. 9 is a schematic diagram of a landing phase of a legged robot according to an embodiment of the present disclosure.

FIG. 10 is a schematic diagram of angle implementation of a legged robot based on a degree of freedom according to an embodiment of the present disclosure.

FIG. 11 is another flowchart of a motion control method for a legged robot according to an embodiment of the present disclosure.

FIG. 15 is a schematic diagram of a continuous bound process of a legged robot according to an embodiment of the present disclosure.

FIG. 16 is another schematic diagram of a continuous bound process of a legged robot according to an embodiment of the present disclosure.

FIG. 17 is a schematic diagram of a planar model of a quadruped robot according to an embodiment of the present disclosure.

DESCRIPTION OF EMBODIMENTS

Figures 1A, 1B:
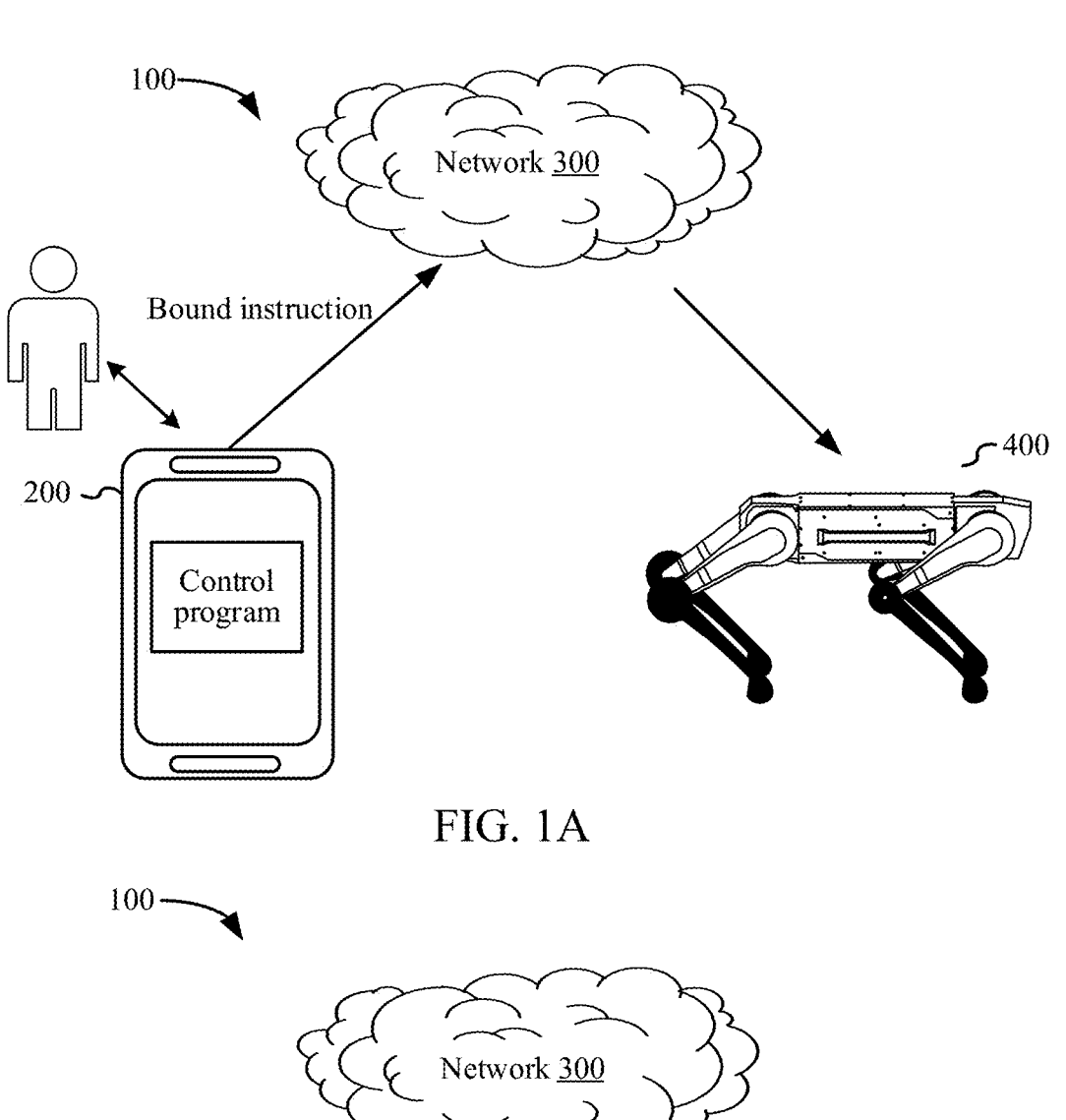
FIG. 1A to FIG. 1B are schematic architectural diagrams of a motion control system 100 for a legged robot according to an embodiment of the present disclosure.

To make the objectives, technical solutions, and advantages of the present disclosure clearer, the present disclosure is described in detail with reference to drawings. The described embodiments are not to be construed as a limitation on the present disclosure. All other embodiments obtained by a person of ordinary skill in the art without creative efforts fall within the protection scope of the present disclosure.

In the following description, a term "some embodiments" describes subsets of all possible embodiments, but it may be understood that "some embodiments" may be the same subset or different subsets of all of the possible embodiments, and may be combined with each other without conflict.

In the following description, a term "first/second/third" is merely used for distinguishing between similar objects and does not represent a specific order of objects. It may be understood that "first/second/third" may be transposed in a specific order or a sequence if allowed, so that the embodiments of the present disclosure described herein may be implemented in an order other than those illustrated or described herein.

Unless otherwise defined, meanings of all technical and scientific terms used in this specification are the same as those usually understood by a person skilled in the art to which the present disclosure belongs. The terms used in this specification are merely intended to describe objectives of the embodiments of the present disclosure, and are not intended to limit the present disclosure.

Embodiments of the present disclosure provide a motion control method and apparatus for a legged robot, a legged robot, a computer-readable storage medium, and a computer program product, which can improve a precision of controlling motions of a legged robot and diversify the motions of the legged robot.

Before the embodiments of the present disclosure are described in detail, a description is made on nouns and terms in the embodiments of the present disclosure, and the nouns and terms in the embodiments of the present disclosure are applicable to the following explanations.

1) Robot: It is an intelligent machine that can work in a semi-autonomous or fully-autonomous manner, including various types of machine devices that simulate human behaviors or ideologically simulate other creatures (such as a robot dog and a robot cat). In a broad sense, some computer programs are also referred to as robots. In contemporary industry, a robot is an artificial robot that can automatically perform tasks, and is configured to work in replacement of humans or provide assistance in work. A robot may be an electromechanical apparatus, or may be controlled by a computer program or an electronic circuit.

2) Legged robot: It means in general a robot having foot-ends. The legged robot may be equipped with one or more legs, and each leg may be equipped with one or more joints. Usually, one leg corresponds to three joints, and each leg corresponds to one foot-end. The legged robot is, for example, a biped robot, a quadruped robot, or a hexapod robot. The quadruped robot is, for example, a robot dog. The legged robot may include a plurality of foot-ends, and foot-ends that land at different moments may be different. Therefore, for ease of distinguishing, the foot-ends of the legged robot may be expressed as a first foot-end, a second foot-end, . . . , and an $i^{th}$ foot-end. When a foot-end lands, the robot moves a leg corresponding to the foot-end.

3) Landing point: It is a position at which a foot-end of a robot contacts a contact surface, and means in general a landing point of a robot. A landing point may be a start landing point or a candidate landing point. When the candidate landing point is selected as the landing point of the foot-end, the candidate landing point may be considered as a target landing point. The start landing point is a landing point of a legged robot corresponding to a start moment.

4) Generalized coordinates: It is an independent variable that can be used to determine a position of a center of mass (including at least one mass point), for example, angle and area. Polar coordinates, cylindrical coordinates, spherical coordinates, and curvilinear coordinates all belong to the generalized coordinates. In other words, the generalized coordinates are a set of coordinates. A position of a mass point moving in a three-dimensional space may be described by using three rectangular coordinates, or may be described by using three spherical coordinates, all of which are referred to as generalized coordinates. In analytical mechanics, the generalized coordinates are usually conventionally selected as a series of independent coordinates. Examples are provided to describe the independent coordinates. To determine a position of a free mass point in the three-dimensional space, three coordinates need to be used. The three coordinates are independent of one another and are indispensable.

In the three-dimensional space, one mass point has three generalized coordinates. In other words, any position in the three-dimensional space may be found by using three independent variables.

5) Degree of freedom: Independent coordinates of a single rigid body are referred to as a degree of freedom. In a three-dimensional space, one unconstrained single rigid body has 6 degrees of freedom, including 3 translational degrees of freedom and 3 rotational degrees of freedom. The three rotational degrees of freedom include a pitch, a yaw, and a roll about corresponding axes. A right-hand Cartesian coordinate system in the three-dimensional space is used as an example. Rotation about an X axis is referred to as roll, and an angle of rotation about the X axis may be represented by using the, that is, a roll angle. An angle of rotation about a Y axis may be represented by using pitch, which may be referred to as a pitch angle. Rotation about a Z axis is represented by using yaw, which is also referred to as a yaw angle.

6) Model predictive control (MPC): It is a control method for predicting a controlled object. The MPC actually means solving a control problem through an optimization method, or providing an action of a controller through solution of an optimization problem. Operation of the MPC is described as follows: A desired reference trajectory exists throughout control. A moment is used as a current moment (a position at which a vertical axis of a coordinate system is located). The controller predicts output of the system in a future time domain in combination with a current measured value and a prediction model. A series of control sequences in a control time domain are obtained through solution of an optimization problem that satisfies an objective function and various constraints, and a first element of the control sequences is used as an actual control quantity of the controlled object. When a next moment comes, the above process is repeated. Optimization problems with constraints are cyclically solved to implement continuous control of the controlled object. The MPC is a type of feedback control. For example, when crossing a road, a model regarding an own velocity and a travelling velocity of an oncoming car in the brain can be established. The model can then be modified and velocity with each step can be adjusted, to ensure not to be hit.

7) Spatial landing constraint condition: It is used for constraining each foot-end of a legged robot to be in a workspace corresponding to the foot-end after each step. The spatial landing constraint condition may be used for constraining a center of mass position change coefficient, a step sequence, and a landing point of the robot.

8) Friction constraint condition: It is used for constraining a contact force of a foot-end to be within a cone of friction, to avoid slipping between a legged robot and a contact surface. The friction cone is determined based on a normal vector of the legged robot at a candidate landing point and a friction coefficient between the foot-end that lands and the contact surface.

9) Foot-end contact force constraint condition: It is used for constraining a foot-end contact force to be less than or equal to a contact force upper limit in a normal direction, to avoid an excessive force between a legged robot and a contact surface.

A motion control system for a legged robot provided in the embodiments of the present disclosure is described below based on the above descriptions of the terms and the nouns in the embodiments of the present disclosure. FIG. 1A to FIG. 1B are schematic architectural diagrams of a motion control system 100 for a legged robot according to an embodiment of the present disclosure. To support an exemplary application, the system includes a legged robot 400 and a control device 200. In some embodiments, the control device 200 and the legged robot 400 are devices independent relative to each other. The legged robot 400 includes at least two foot-ends (a legged robot including four foot-ends is exemplarily shown). In this case, the legged robot 400 is connected to the control device 200 through a network 300. The network 300 may be a wide area network, a local area network, or a combination thereof. The legged robot 400 and the control device 200 may be directly or indirectly connected through wired or wireless communication, which is not limited in this embodiment of the present disclosure.

The control device 200 is configured to: receive a bound instruction for the legged robot when the foot-ends of the legged robot stand in unit regions independent from one another, the bound instruction being used for instructing the legged robot to bound to a target unit region from at least two unit regions in which the legged robot is currently located; and transmit a control instruction to the legged robot 400 in response to the bound instruction, the control instruction being used for controlling the legged robot to bound to the target unit region.

The above bound instruction may be received from an upper computer or obtained based on an input operation of a user. The upper computer may be any device wirelessly or wiredly connected to the control device 200. The upper computer is, for example, a terminal or a server.

The legged robot 400 is configured to control the legged robot to bound to the target unit region in response to the above control instruction, a distance between any two foot-ends of the legged robot in the target unit region being less than a distance between the two corresponding foot-ends before the bound.

The control device 200 may be implemented through a terminal or a server. The terminal may be a smartphone, a tablet computer, a notebook computer, a desktop computer, a smart speaker, a smartwatch, or the like, but is not limited thereto. The server includes but is not limited to an independent physical server, a server cluster formed by a plurality of physical servers, a distributed system, or a cloud server providing basic cloud computing services such as a cloud service, a cloud database, cloud computing, a cloud function, cloud storage, a network service, cloud communication, a middleware service, a domain name service, a security service, a content delivery network (CDN), big data, and artificial intelligence platform. The terminal and the server may be directly or indirectly connected in a manner of wired or wireless communication, which is not limited in the embodiments of the present disclosure.

In some embodiments, the control device 200 is a part of the legged robot 400. The control device 200 may be arranged in a body of the legged robot 400. For example, the control device 200 is an internal processor in the legged robot 400. Correspondingly, the control device 200 receives the bound instruction for the legged robot when the foot-ends of the legged robot stand in the unit regions independent from one another, the bound instruction being used for instructing the legged robot to bound to the target unit region from the at least two unit regions in which the legged robot is currently located. The control device 200 controls the legged robot to bound to the target unit region in response to the bound instruction, the distance between any two foot-ends of the legged robot in the target unit region being less than the distance between the two corresponding foot-ends before the bound.

Figure 1C:
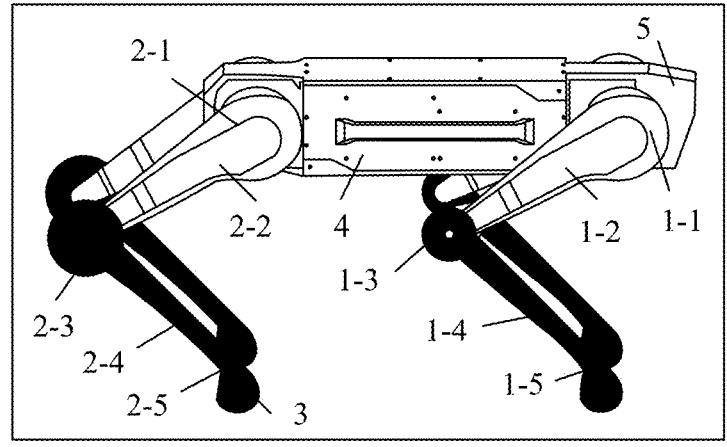
FIG. 1C is a schematic structural diagram of a quadruped robot according to an embodiment of the present disclosure.

For example, the legged robot is a quadruped robot. FIG. 1C is a schematic structural diagram of a quadruped robot according to an embodiment of the present disclosure. No. 1 indicates a front leg, No. 1-1 indicates a front leg hip joint, No. 1-2 indicates a front thigh, No. 1-3 indicates a front leg knee joint, No. 1-4 indicates a front calf, No. 1-5 indicates a front leg ankle joint, No. 2 indicates a rear leg, No. 2-1 indicates a rear leg hip joint, No. 2-2 indicates a rear thigh, No. 2-3 indicates a rear leg knee joint, No. 2-4 indicates a rear calf, No. 2-5 indicates a rear leg ankle joint, No. 3 indicates a foot-end, No. 4 indicates a torso, and No. 5 indicates a head. An angle between a thigh and a calf facing the head is a joint angle of a knee joint. Unless otherwise specified, each quantity is a representation in a world coordinate system.

Figure 1D:
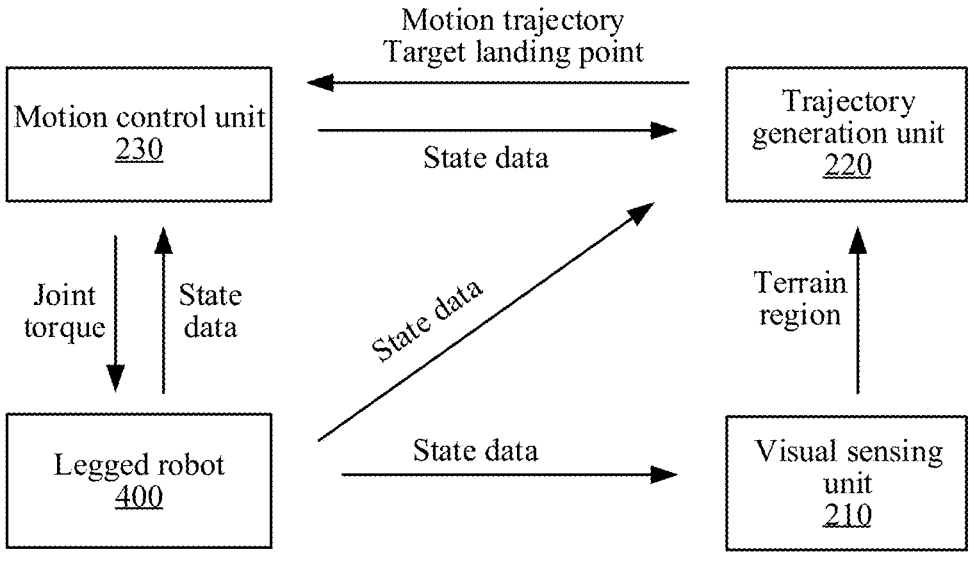
FIG. 1D is a schematic structural diagram of a control device according to an embodiment of the present disclosure.

To describe a structure of the control device 200 more clearly, FIG. 1D is a schematic structural diagram of a control device according to an embodiment of the present disclosure. An exemplary description is provided below with reference to the motion control system for a legged robot shown in FIG. 1. In FIG. 1, the control device 200 includes a visual sensing unit 210, a trajectory generation unit 220, and a motion control unit 230, for example. The visual sensing unit 210 may be arranged on the legged robot 400, for example, mounted to a head of the legged robot 400. The visual sensing unit 210 includes one or more of, for example, a camera and an infrared camera. The camera is, for example, an RGBD camera. The visual sensing unit further includes a function for implementing simultaneous localization and mapping. The visual sensing unit 210 collects state data of the legged robot. The state data includes state data of the legged robot 400 at a start moment. In addition, the visual sensing unit 210 can further collect an environmental image of the legged robot 400 and obtain a possible target unit region (a landing point after a bound operation) for each landing of the legged robot 400. After the state data and the environmental image are obtained, the visual sensing unit 210 can transmit the state data and the environmental image to the trajectory generation unit 220. Alternatively, the trajectory generation unit 220 can obtain state data of the legged robot 400 through an internal sensor and an external sensor of the legged robot 400. Alternatively, the trajectory generation unit 220 may use desired state data at an end moment of a previous planning cycle as state data at a start moment of a current corresponding planning cycle. Alternatively, the trajectory generation unit 220 obtains the state data of the legged robot 400 through a state estimator of the motion control unit 230. The trajectory generation unit 220 receives the state data and the target unit region (a landing point after a bound operation), determines states of the legged robot 400 at a plurality of moments (the states are determined based on state data such as a joint angle, an altitude of a center of mass, a joint bending degree, and a joint descent altitude), obtains a motion trajectory of the center of mass of the legged robot 400 based on positions of the center of mass and positions of the target unit region at the plurality of moments, then determines a bound trajectory of the legged robot 400 based on the motion trajectory of the center of mass and the target unit region (a landing point after a bound operation, or referred to as a target landing point), and transmits the bound trajectory and the target landing point to the motion control unit 230. The motion control unit 230 can determine a joint torque of each joint of the legged robot 230 based on the bound trajectory and the target landing point, and control each joint of the legged robot 400 to rotate based on the joint torque, thereby implementing a bound motion of the legged robot 400.

In some embodiments, the motion control unit 230 can further monitor real-time state data (state data composed of values of state parameters, or may be referred to as control data) in the bound process of the legged robot 400, and control the bound of the legged robot 400 based on the real-time state data, to ensure stable movement of the legged robot 400.

This embodiment of the present disclosure may be further implemented through a cloud technology. The cloud technology is a hosting technology that unifies a series of resources such as hardware, software, and a network in a wide area network or a local area network to realize data computing, storage, processing, and sharing.

FIG. 2 is a schematic structural diagram of a control device 500 configured to implement a motion control method for a legged robot according to an embodiment of the present disclosure. In a practical application, the control device 500 may be a server or a terminal. The control device configured to perform the motion control method for a legged robot in this embodiment of the present disclosure is described by using an example in which the control device 500 is the terminal. The control device 500 provided in this embodiment of the present disclosure includes at least one processor 510, a memory 550, at least one network interface 520, and a user interface 530. The components in the control device 500 are coupled together through a bus system 540. It may be understood that the bus system 540 is configured to implement connection and communication between the components. In addition to a data bus, the bus system 540 further includes a power bus, a control bus, and a state signal bus. For clarity, all of the buses are marked as the bus system 540 in FIG. 2.

The processor 510 may be an integrated circuit chip with a signal processing capability, for example, a general-purpose processor, a digital signal processor (DSP), another programmable logic device, a discrete gate or a transistor logic device, a discrete hardware component, or the like. The general-purpose processor may be a microprocessor, any suitable processor, or the like.

The user interface 530 includes one or more output apparatuses 531 that enable presentation of media content, including one or more speakers and/or one or more visual displays. The user interface 530 further includes one or more input apparatuses 532, including user interface components that facilitate user input, such as a keyboard, a mouse, a microphone, a touch screen display, a camera, and another input button and control.

The memory 550 is removable, non-removable, or a combination thereof. An exemplary hardware device includes a solid-state memory, a hard disk driver, an optical disk driver, and the like. The memory 550 optionally includes one or more storage devices physically away from the processor 510.

The memory 550 may be a volatile memory or a non-volatile memory, or may include both a volatile memory and a non-volatile memory. The non-volatile memory may be a read-only memory (ROM). The volatile memory may be a random access memory (RAM). The memory 550 described in this embodiment of the present disclosure is intended to include any suitable type of memory.

In some embodiments, the memory 550 can store data and support various operations. Examples of the data include a program, a module, and a data structure or a subset or a superset thereof. An exemplary description is provided below.

An operating system 551 includes system programs configured to process basic system services and perform hardware-related tasks, for example, a frame layer, a core library layer, and a drive layer, and is configured to implement basic services and process hardware-based tasks.

A network communication module 552 is configured to arrive at another computing device through one or more (wired or wireless) network interfaces 520. An exemplary network interface 520 includes Bluetooth, wireless fidelity (Wi-Fi), a universal serial bus (USB), and the like.

A presentation module 553 is configured to enable presentation of information (for example, a user interface for operating a peripheral device and display a content and information) through the one or more output apparatuses 531 (for example, a display and a speaker) associated with the user interface 530.

An input processing module 554 is configured to detect user inputs or interactions from the one or more input apparatuses 532 and translate the detected inputs or interactions.

In some embodiments, a motion control apparatus for a legged robot provided in this embodiment of the present disclosure may be implemented by software. FIG. 2 shows a motion control apparatus 555 for a legged robot stored in the memory 550, which may be software in a form of programs, plug-ins, and the like, including the following software modules: a receiving module 5551 and a control module 5552. The modules are logical. Therefore, the modules may be combined or split based on to-be-implemented functions. Functions of the modules are described below.

In some other embodiments, the motion control apparatus for a legged robot provided in this embodiment of the present disclosure may be implemented through a combination of software and hardware. In an example, the motion control apparatus for a legged robot provided in this embodiment of the present disclosure may be a processor in a form of a hardware decoding processor, which is programmed to perform the motion control method for a legged robot provided in the embodiments of the present disclosure. For example, the processor in the form of the hardware decoding processor may be one or more application specific integrated circuits (ASICs), a DSP, a programmable logic device (PLD), a complex programmable logic device (CPLD), a field-programmable gate array (FPGA), or another electronic element.

The motion control method for a legged robot provided in the embodiments of the present disclosure is described with reference to an exemplary application and implementation of the legged robot provided in the embodiments of the present disclosure. The method is performed by the control device. In some embodiments, the control device may exist independently of the legged robot. In some other embodiments, the control device may be arranged inside the legged robot as a part of the legged robot. FIG. 3A to FIG. 3B are schematic flowcharts of a motion control method for a legged robot according to an embodiment of the present disclosure. For example, the method is performed by a legged robot. A description is provided with reference to steps shown in FIG. 3A.

Step 101: The legged robot receives a bound instruction for the legged robot when foot-ends of the legged robot stand in unit regions independent from one another, the bound instruction being used for instructing the legged robot to bound to a target unit region from at least two unit regions in which the legged robot is currently located.

The unit regions are described. In some embodiments, the unit regions and the target unit region may be in the following form: the unit regions and the target unit region each are an end surface region of a single pile in a set of quincuncial piles, and a shape and a size of each unit region are the same as a shape and a size of the target unit region.

In a practical implementation, the unit regions may be a series of discrete and independent landing points (the unit regions) obtained by the control device of the legged robot through area division and discretization such as refining of a terrain region. The unit region may be similar to the end surface region of the single pile in the set of quincuncial piles. The legged robot can control the legged robot to complete a bound action with high dynamic performance and difficulty in a terrain region in the form of a quincuncial pile pattern or a terrain region that may be discretized into quincuncial piles. The bound action may include that the legged robot bounds to an end surface region of a same single pile in the set of quincuncial piles from the end surface regions of the single piles at which the foot-ends of the legged robot stand. If a quadruped robot is used as an example, the bound action may be an action of the quadruped robot for converging four feet and landing on a single pile in balance from a state of standing discretely on four piles. The bound action may further include a bound action the legged robot bounds to the end surface regions of the single piles in the set of quincuncial piles from the end surface region of the single pile at which the foot-ends of the legged robot stand. If the quadruped robot is used as an example, the bound action may be a bound action of the quadruped robot to four piles from the single pile at which the four feet converge. The target unit region is mainly used for representing a region for limiting the landing point of the legged robot. In other words, when the legged robot is in the target unit region (a target landing point), the legged robot maintains balance with the foot-ends converge below a body. When the foot-ends are discrete, the legged robot is prone to losing steps or falling down.

Exemplarily, FIG. 4 is a schematic diagram of a terrain region in the form of a quincuncial pile pattern according to an embodiment of the present disclosure. A set of quincuncial piles shown in the figure include a plurality of independent single piles (the unit regions) with a same area of region. In a practical application, different terrains may be discretized into a plurality of unit regions with different altitudes and different areas of region.

In a practical implementation, an initial state of the legged robot is that the foot-ends of the legged robot stand in a plurality of independent unit regions, that is, the foot-ends of the legged robot are in a one-to-one correspondence with the unit regions. Exemplarily, FIG. 5 is a schematic diagram of an initial state of a legged robot according to an embodiment of the present disclosure. In the figure, a quadruped robot is used as an example. The unit region is the end surface region of the single pile in a set of quincuncial piles. Four feet of the quadruped robot respectively stand on four single piles (that is, the unit regions) in the set of quincuncial piles.

A manner of receiving the bound instruction by the legged robot is described. In a practical implementation, the legged robot may receive the bound instruction for the legged robot. A triggering manner of the bound instruction may be external triggering or internal triggering. The external triggering may mean that the legged robot receives a bound instruction inputted by a user (an input form may be a voice input or a text input), the user triggers a function configured to control the legged robot to bound, or the user transmits a triggering to the legged robot through a terminal (for example, a mobile phone or a remote control). The internal triggering may mean that the bound instruction is generated by a controller built in the robot, for example, generated when it is determined based on the terrain that the legged robot needs to bound to the target unit region during a motion.

In a practical application, the bound instruction may include at least one of a forward bound instruction and an upward bound instruction. For example, the above may be determined based on a position of the target unit region relative to the unit regions. The bound instruction is the forward bound instruction when the target unit region is in front of the legged robot, and the bound instruction is the upward bound instruction when the target unit region is located at a center of the unit regions. Unless otherwise specified below, the bound instruction is the forward bound instruction. Different bound instruction forms correspond to different bound processes.

Step 102: Control the legged robot to bound to the target unit region in response to the bound instruction, a distance between any two foot-ends of the legged robot in the target unit region being less than a distance between the two corresponding foot-ends before the bound.

A distance between any two feet of the legged robot before the bound is a first distance, and a distance between any two feet after the legged robot bounds to the target unit region is a second distance. The second distance is less than the first distance. Exemplarily, the legged robot is a quadruped robot, including two front feet (a first foot and a second foot) and two rear feet (a third foot and a fourth foot). A distance between the first foot and the second foot after the bound is less than a distance between the first foot and the second foot before the bound. A distance between the third foot and the fourth foot after the bound is less than a distance between the third foot and the fourth foot before the bound. A distance between the first foot and the third foot after the bound is less than a distance between the first foot and the third foot before the bound. A distance between the second foot and the fourth foot after the bound is less than a distance between the second foot and the fourth foot before the bound.

In a practical implementation, the legged robot performs a corresponding bound action in response to the bound instruction. Before performing the bound action, the legged robot can generate a reference bound trajectory corresponding to a current bound action by using an MPC method. The reference bound trajectory may include state parameters of at least two key points. Each phase corresponds to corresponding control information. The legged robot analyzes the control information to obtain a motion trajectory corresponding to each phase.

In some embodiments, FIG. 6 is a schematic flowchart of obtaining a state parameter according to an embodiment of the present disclosure. A manner of obtaining a state parameter corresponding to each key point of a bound process performed based on the reference bound trajectory is described with reference to steps shown in FIG. 6.

Step 201: The legged robot predicts a bound trajectory of the legged robot, to obtain a reference bound trajectory.

In a practical implementation, after receiving the bound instruction, the legged robot can obtain the reference bound trajectory corresponding to the bound instruction by using the MPC method. The reference bound trajectory is a most labor-saving reference trajectory that satisfies a constraint condition obtained after an optimization problem (an established nonlinear optimization problem is to plan a bound trajectory corresponding to a current bound instruction to achieve an optimization goal of a minimum driving force) is solved. The reference bound trajectory can effectively ensure feasibility of each action performed by the legged robot in the bound process. In this way, successful prediction of the reference bound trajectory can be achieved. In the bound process, the legged robot controls the bound action of the legged robot to be as consistent as possible with the reference bound trajectory.

Step 202: Obtain a constraint condition corresponding to the bound instruction, the constraint condition being used for constraining the bound of the legged robot.

In a practical implementation, different bound instructions may correspond to different reference bound trajectories, and the constraint condition varies during obtaining of different reference bound trajectories. The constraint condition is used for constraining the bound of the legged robot. The constraint condition for the bound instruction may include a spatial landing constraint condition, a friction constraint condition, a foot-end contact force constraint condition, and the like. For example, for the bound action of the legged robot on a set of quincuncial piles in this embodiment of the present disclosure, the constraint condition includes a joint torque limit, a foot-end cone of friction, a joint descent altitude threshold, a dynamic constraint, no sliding at foot-ends, and the like.

Step 203: Determine state parameters of at least two key points in the reference bound trajectory based on the reference bound trajectory and the constraint condition.

In some embodiments, during the determination of the state parameters of the at least two key points, the legged robot first obtains the at least two key points in the reference bound trajectory. The key points include at least one of a start point of the reference bound trajectory, a vertex of the reference bound trajectory, and an end point of the reference bound trajectory.

In a practical implementation, the key points may be sampling points at operation phases in the bound process. Parameter values of the state parameters corresponding to the legged robot at the sampling points may be represented in a form of generalized coordinates. For ease of description, each parameter value of each state parameter corresponding to each key point is referred to as control information. In other words, one key point corresponds to one piece of control information. The legged robot controls a corresponding operation performed by the legged robot to be consistent with the reference bound trajectory as much as possible based on the obtained control information of each key point. The state parameter may include a position of a center of mass of the legged robot, a position of each foot-end, and a joint angle, a joint angular velocity, a joint angular acceleration, a joint torque, and a joint degree of freedom of each joint. The control data represented by using the generalized coordinates is described in detail below by using a quadruped robot as an example.

In some embodiments, the legged robot may bound to a target unit region located in front of the legged robot through the following phases: The legged robot controls the legged robot to bound forward to the target unit region through a take-off phase, a flight phase, and a landing phase in response to the bound instruction.

In a practical implementation, an entire process in which the foot-ends of the legged robot bound to the target unit region forward from corresponding unit regions may be divided into the take-off phase, the flight phase, and the landing phase. The legged robot obtains the control information of each key point based on the reference bound trajectory corresponding to the current bound instruction. The legged robot analyzes the control information to obtain a parameter value of the state parameter corresponding to each operation, thereby presenting a corresponding form.

In some embodiments, the legged robot can perform the following operations in the take-off phase of the bound process. In the take-off phase, the legged robot successively performs actions of crouching, foot-end push-off, and starting flight.

In a practical implementation, in the take-off phase, the legged robot can obtain at least control information of the following key points in the reference bound trajectory: crouching, foot-end push-off, and starting flight. In the take-off phase of the entire bound process, the legged robot successively performs the operations of crouching, foot-end push-off, and starting flight from an initial state of normally standing in the independent unit regions. For each operation, the legged robot controls the legged robot to be in a state corresponding to the operation based on the corresponding control information.

Exemplarily, FIG. 7 is a schematic diagram of a take-off phase of a legged robot according to an embodiment of the present disclosure. In the figure, the legged robot is a quadruped robot, and a unit region is a single pile in a set of quincuncial piles. No. 1 in the figure shows an initial state of the quadruped robot. No. 2 in the figure shows a crouching operation performed by the legged robot in the take-off phase of a bound process. No. 3 in the figure shows a foot-end push-off operation performed by the legged robot in the take-off phase of the bound process. No. 4 in the figure shows a flight operation performed by the legged robot in the take-off phase of the bound process.

In some embodiments, in the take-off phase of the legged robot, body parts of the legged robot may present the following changes of form: In a crouching process of the legged robot, legs of the legged robot are bent, to lower a center of mass of the legged robot from an initial altitude to a take-off altitude. In a foot-end push-off process of the legged robot, the legged robot increases a torque of a joint of each leg, to increase a friction between each foot-end and a foot-end contact surface. In a flight process of the legged robot, the legged robot performs a forward and upward take-off action at a target pitch angle, to increase altitudes of knee joints and an altitude of the center of mass. The altitude of the center of mass is greater than the initial altitude.

In a practical implementation, the legged robot obtains first control information corresponding to the crouching. The first control information includes a joint angle of each joint of the legged robot and an altitude of the center of mass of the legged robot. Each joint of the legged robot is controlled to bend to the joint angle specified in the first control information from a joint angle in the initial state based on the first control information, and the center of mass is controlled to descend from the initial altitude to the take-off altitude. The take-off altitude herein is the altitude of the center of mass specified in the first control information. The altitude of the center of mass specified in the first control information is determined based on a constraint condition that each joint cannot touch a contact surface of the unit region and a constraint condition of a joint torque limit. After the crouching is completed, the legged robot starts the foot-end push-off operation. The legged robot obtains second control information corresponding to the foot-end push-off. The second control information includes values of joint torques of the legged robot and a pitch angle (for example, an elevation angle) of the legged robot. In the push-off process, the joint torque of each joint is increased to the value of the joint torque indicated in the second control information, to increase the friction between the foot-end and the contact surface, a head of the legged robot is controlled to lift (a pitch angle of the legged robot is increased to the pitch angle indicated in the second control information), an altitude of a hip joint is controlled to decrease, an included angle between a body torso and a thigh joint is controlled to increase, for example, increase to 180 degrees, an included angle of a front leg joint is controlled to increase, and the center of mass is controlled to shift. The second control information herein is determined at least based on a constraint condition (a friction constraint condition) that the foot-ends do not slide in the push-off process. When the foot-end push-off is completed, the flight action is performed. In this case, the legged robot obtains third control information corresponding to the action of starting flight. The third control information includes a position of the center of mass of the legged robot, a pitch angle, a joint angle of each joint, and a rate of change of each joint angle. The legged robot adjusts a position of the center of mass to the position of the center of mass position in the third control information based on the third control information. In this case, the altitude of the center of mass is greater than the initial altitude, the pitch angle during the foot-end push-off is reduced to the pitch angle in the third control information, the joint angle of each joint is increased to the joint angle in the third control information, and a rate of change of each joint angle is consistent with the change of rate of each joint angle in the third control information.

Based on the above example, the legged robot is the quadruped robot, for example. Refer to the crouching operation performed by the legged robot shown by No. 2 in FIG. 7. Compared to the initial state shown by No. 1 in FIG. 7, the joint angle of each joint of the legged robot is control to bend from a joint angle in the initial state, and the center of mass is control to descend from the initial altitude to the take-off altitude. Refer to the foot-end push-off operation performed by the legged robot shown by No. 3 in the figure. Compared to the state during the crouching shown by No. 2 in FIG. 7, the head of the legged robot is controlled to lift, altitudes of hip joints of the rear legs are controlled to decrease, and the body torso is controlled to be in a straight line with rear thighs. Refer to the flight operation performed by the legged robot shown by No. 4 in the figure. Compared to the state during the foot-end push-offs shown by No. 3 in FIG. 7, the joint altitude of each joint is increased, the altitude of the center of mass is controlled to be greater than the initial altitude, the center of mass is controlled to move forward and upward, the joint angle of each joint is increased, and the torso is parallel to the pile surfaces.

In some embodiments, the flight phase of the legged robot in the bound process may include the following actions: the legged robot successively contracts feet and the legs in the air and stretches the legs in the air.

In a practical implementation, in the flight phase of the entire bound process, the legged robot successively performs the actions of foot and leg contraction in the air and leg stretching in the air from a pose corresponding to the take-off phase, and dynamically changes the pose of the legged robot during each action based on the control information corresponding to each action.

Exemplarily, FIG. 8 is a schematic diagram of a flight phase of a legged robot according to an embodiment of the present disclosure. In the figure, the legged robot is a quadruped robot, and a unit region is a single pile in a set of quincuncial piles. No. 1 in the figure shows an operation of foot and leg contraction in the air performed by the legged robot in the flight phase of a bound process. No. 2 in the figure shows a leg stretching operation performed by the legged robot in the flight phase of the bound process.

In some embodiments, in the flight phase, body parts of the legged robot may present the following changes of form: In a foot and leg contraction process of the legged robot in the air, the legged robot controls each leg to drive the corresponding foot-end to converge upward to a position below a center of mass of a body. In a leg stretching process of the legged robot in the air, the legged robot controls a front leg of the legged robot to stretch toward a target unit region, a stretching degree of the front leg of the legged robot enabling each foot-end of the legged robot to land on the target unit region.

In a practical implementation, the legged robot obtains fourth control information corresponding to the leg stretching in the air. The fourth control information includes a joint angular velocity, a joint acceleration, an altitude of a center of mass, and a movement component of the center of mass in a horizontal direction (a movement direction of the legged robot). The legged robot is controlled to gradually converge the foot-ends to a position below the center of mass of a body in the air based on the fourth control information. In other words, after the legged robot completes the flight action, a joint angle of each joint is controlled to change to the joint angular velocity specified in the fourth control information, a joint acceleration is controlled to increase to the joint acceleration specified in the fourth control information, the altitude of the center of mass is controlled to increase, and a component of the center of mass along an X axis is controlled to increase (that is, the center of mass moves forward). When the altitude of the center of mass starts to decrease, fifth control information for the leg stretching in the air is obtained. The fifth control information includes a movement component of the center of mass in the horizontal direction (the movement direction of the legged robot), an altitude of the center of mass, a pitch angle of the legged robot, and a joint angle of each joint. Based on the fifth control information, the component of the center of mass along the X axis is further controlled to increase, the altitude of the center of mass is further controlled to decrease, the body is further controlled to be at a target angle of depression (an overlooking angle in the pitch angle), and the joint angle of each front leg joint is further controlled to decrease to the joint angle in the fifth control information to prepare for landing. Because the quantity of target unit regions is one, and a distance by which a rear leg extends forward is relatively large, the rear leg is controlled to stretch toward the target unit region based on the joint angle of each knee joint of the rear leg and the joint angle of each hip joint in the fifth control information.

Based on the above example, the legged robot is the quadruped robot, for example. Refer to the operation of foot and leg contraction in the air performed by the legged robot shown by No. 1 in FIG. 8. Compared to the state during the flight operation shown by No. 4 in FIG. 7, the legged robot is controlled to gradually converge the foot-ends to a position below the center of mass of the body in the air, the altitude of the center of mass is controlled to increase, and the component of the center of mass along the X axis is controlled to increase (that is, the center of mass moves forward). Refer to the operation of leg stretching in the air performed by the legged robot shown in No. 2 in the figure. Compared to the state during the foot and leg contraction in the air shown by No. 1 in FIG. 8, the component of the center of mass along the X axis is further controlled to increase, the center of mass is further controlled to move forward and downward, the altitude of the center of mass is further controlled to decrease, and the head is controlled to have the target angle of depression.

In some embodiments, the landing phase of the legged robot in the bound process may include the following actions: the legged robot successively performs foot-end landing, legs bending and cushioning, and body balancing.

In a practical implementation, in the landing phase of the entire bound process, the legged robot successively performs the operations of foot-end landing, leg bending and cushioning, and body balancing from a pose during the operation of stretching toward the target unit region in the flight phase, and dynamically changes the pose of the legged robot during each operation based on the control information corresponding to each operation.

Exemplarily, FIG. 9 is a schematic diagram of a landing phase of a legged robot according to an embodiment of the present disclosure. In the figure, the legged robot is a quadruped robot, and a unit region is a single pile in a set of quincuncial piles. No. 1 in the figure shows a foot-end landing operation performed by the legged robot in the landing phase of a bound process. No. 2 in the figure shows a leg bending and cushioning operation performed by the legged robot in the landing phase of the bound process. No. 3 in the figure shows a body balancing operation performed by the legged robot in the landing phase of the bound process.

In some embodiments, in the landing phase of the legged robot, body parts of the legged robot may present the following changes of form: In a foot-end landing process of the legged robot, the legged robot controls the foot-ends to simultaneously contact a contact surface in a target unit region. In a leg bending and cushioning process of the legged robot, the legged robot performs a leg bending action of bending and contracting the legs, and increases torques of joints of the legs, to reduce a velocity of the legged robot. In a body balancing process of the legged robot, the legged robot adjusts a body pose to move a center of mass of the legged robot to the target unit region.

In a practical implementation, the legged robot obtains sixth control information for the foot-end landing. The sixth control information includes a joint angle of each joint and a stretching degree (a distance) of each leg. The foot-ends of the legged robot simultaneously contact the contact surface of the target unit region. In this case, knee joints of rear legs of the legged robot are still at a relatively large joint angle. This is because a distance by which the rear legs stretch toward the target unit region is greater than a distance by which front legs stretch toward the target unit region. To ensure simultaneous contact of the foot-ends, the joint angle needs to be greater than a joint angle during the leg stretching in the air. After the foot-ends simultaneously contact the contact surface of the target unit region, the legged robot starts to control each leg to perform the leg bending action of bending and contracting the leg based on seventh control information corresponding to the leg bending and cushioning. The seventh control information includes a torque of each joint, a position of the center of mass, and a joint angle. The legged robot applies torque control to each joint simultaneously based on the seventh control information to cushion and decelerate the legged robot, and stably moves a projection of the center of mass of the body into the target unit region, thereby finally implementing balance. Due to a relatively large distance by which the rear legs stretch forward (stretching distances of the knee joints and the hip joints of the rear legs are large) during contact with the pile surfaces, the knee joints of the rear legs tend to move downward during cushioning after landing. To avoid collisions between calves of the rear legs and the contact surface of the target unit region after the knee joints descend to be lower than the target unit region, the seventh control information is determined based on the friction constraint condition, the spatial landing constraint condition, and the foot-end contact force constraint condition. During control of leg bending and cushioning of the legged robot based on the joint angle of each joint and the position of the center of mass in the seventh control information, a bending and contraction degree of the rear legs is controlled not to exceed a contraction degree threshold, and a descent degree of the knee joints of the rear legs is controlled not to exceed a descent degree threshold. In addition, it may be ensured that the foot-ends neither rebound as a result of impact after contacting the pile surfaces, nor slide as a result of the poses and the forces of the legs (the seventh control information is determined based on the friction constraint condition).

Based on the above example, the legged robot is the quadruped robot, for example. Refer to the foot-end landing operation performed by the legged robot shown by No. 1 in FIG. 9. Compared to the state of the leg stretching in the air shown by No. 2 in FIG. 8, the foot-ends of the legged robot are controlled to simultaneously contact the pile surface, the center of mass is controlled to decrease, the torso is controlled to be parallel to the pile surface, each joint is controlled to bend, and the hip joints of the front legs is controlled to be in a same straight line as the torso. Refer to the leg bending and cushioning operation performed by the legged robot shown by No. 2 in the figure. Compared to the state during the foot-end landing shown by No. 1, the knee joints are further controlled to bend, the center of mass is further controlled to move backward, the rear thighs are further controlled to be perpendicular to the torso and the rear calves, and the rear calves are further controlled to be parallel to the pile surface. Refer to the body balancing operation performed by the legged robot shown by No. 3 the figure. Compared to the state during the leg bending and cushioning shown by No. 2, the projection of the center of mass of the body is stably moved onto the single pile.

In some embodiments, when the target unit region is located at the center of the unit regions in which the foot-ends are located, the legged robot can implement an upward bound in the following manner: The legged robot controls the legged robot to bound upward and land to the target unit region through the take-off phase, the flight phase, and the landing phase in response to the bound instruction.

In a practical implementation, the legged robot predicts the reference bound trajectory for the upward bound through MPC and obtains control information of each key point on the reference bound trajectory (including reference values of the state parameters), to implement the upward bound of the legged robot to the target unit region. The upward bound process may be divided into the take-off phase, the flight phase, and the landing phase.

Actions performed by the legged robot in each phase of the upward bound process are described. In the take-off phase, the legged robot successively performs the actions of crouching and starting flight. In the flight phase, the legged robot performs the action of foot and leg contraction in the air. In the landing phase, the legged robot successively performs the actions of foot-end landing, leg bending and cushioning, and body balancing. In the crouching process of the legged robot, legs of the legged robot are bent, to lower the center of mass of the legged robot from the initial altitude to the take-off altitude. In a flight process of the legged robot, the legged robot bounds upward, to increase the altitude of each knee joint and the altitude of the center of mass, the altitude of the center of mass being greater than the initial altitude. In the foot and leg contraction process of the legged robot in the air, the legged robot controls the torso of the legged robot to be in an upright state, and each leg of the legged robot drives the corresponding foot-end to converge upward to a position below the torso.

In some embodiments, when the legged robot is a quadruped robot, the legged robot may alternatively implement the bound operation in the following manner: The legged robot controls, in response to the bound instruction, the legged robot to bound to the target unit region by using two front legs and two rear legs alternately when the bound instruction instructs to perform a bound.

In a practical implementation, a bound gait of the quadruped robot during the bound operation may include bound and pronk. The bound indicates that the legged robot bounds by using the two front legs and the two rear legs alternately. For example, the bound manner of the legged robot may be a bounding manner of a quadruped animal (for example, a dog).

In some embodiments, the legged robot may implement a bound process through the following phases: A bounding process of the legged robot bounds by using the two front legs and the two rear legs alternately includes: a crouching phase, a four-feet push-off phase, a rear leg stance phase, a flight phase, and a landing phase.

In some embodiments, as shown in FIG. 3B, after the foot-ends of the legged robot stand within the target unit region and maintain balance, step 103 may be further performed to control the pose of the legged robot.

Step 103: Control the legged robot to continuously perform at least one of a head shaking action and a fishtailing action in the target unit region based on at least one degree of freedom.

In a practical implementation, when the legged robot receives an instruction for a target action within the target unit region, the robot is controlled to complete the target action based on the at least one degree of freedom. The target action includes at least one of the head shaking action and the fishtailing action. In a practical application, the legged robot may further include a tail. The tail is connected to the body parts of the legged robot through at least one joint. Each joint may correspond to at least one degree of freedom. The degree of freedom includes at least one of a roll, a pitch, and a yaw. The legged robot may implement the head shaking action, the fishtailing action, or the head shaking action and the fishtailing action coherently based on the degree of freedom. The degree of freedom of the legged robot is described relative to a space coordinate system. The coordinate system may be a world coordinate system, a body coordinate system using the center of mass of the legged robot as an origin, or the like. In a practical application, in the world coordinate system, a right-hand rule coordinate system is used. A bound direction of the legged robot (a direction in front of the body of the legged robot) is the X axis, a direction on a left side of the legged robot perpendicular to the X axis is a Y axis, and a direction perpendicular to the ground is a Z axis. When the legged robot is to perform the head shaking and fishtailing actions, the legged robot may be controlled to rotate about the X axis (X roll) to obtain a corresponding roll angle, the quadruped robot is controlled to rotate about the Y axis (Y pitch) to obtain a corresponding pitch angle, and the quadruped robot is controlled to rotate about the Z axis (Z yaw) to obtain a corresponding yaw angle. Then the head shaking operation, the fishtailing operation, or the head shaking and fishtailing operation is implemented based on at least one of the pitch angle, the yaw angle, and the roll angle. At the technical implementation level, a reference action trajectory for the head shaking (fishtailing) action performed by the legged robot may be planed based on a controller of the MPC, and optimal target state data for the head shaking or fishtailing action performed by the legged robot is predicted through the MPC in combination with state data of the legged robot in a current state. The state data includes at least one of the position of the center of mass of the body, the joint torque of each joint, and the joint angle of each joint. The legged robot receives the instruction for the target action and target state data that adapts to the target action, and completes the corresponding target action (at least one of the head shaking operation and the fishtailing operation).

Exemplarily, FIG. 10 is a schematic diagram of angle implementation of a legged robot based on a degree of freedom according to an embodiment of the present disclosure. In the figure, a quadruped robot is used as an example. The quadruped robot is located on an end surface of a single quincuncial pile with four legs converging (in this case, the quadruped robot is in a balanced state). Through rotation along an X axis of a coordinate system shown in the figure, control of a roll angle of the quadruped robot on the pile is implemented. Through rotation along a Y axis of the coordinate system shown in the figure, control of a pitch angle of the quadruped robot on the pile is implemented. Through rotation along a Z axis of the coordinate system shown in the figure, control of a yaw angle of the quadruped robot on the pile is implemented.

The above angle control method for the legged robot based on the degree of freedom can expand a motion ability of the robot and diversify actions of the legged robot.

According to the embodiments of the present disclosure, the bound action is completed by the legged robot, which improves a dynamic characteristic, difficulty, and an ornamental value of the motions of the legged robot, and diversifies the motions of the legged robot, so that the legged robot may display actions with high difficulty not only on a flat ground, but also in a scenario such as quincuncial piles and small stone piers. In addition, since the distance between any two foot-ends of the legged robot in the target unit region (the quincuncial piles) is less than the distance between the two corresponding foot-ends before the bound, it may be learned that the bound performed by the legged robot is limited by the target unit region, that is, a landing point of the legged robot is limited, which implements control of the legged robot when bounding into the limited region, improves a precision of controlling the legged robot to bound.

Next, the motion control method for a legged robot provided in the embodiments of the present disclosure is further described below. An initial pose of the legged robot is that the foot-ends stand in a same initial unit region in a converged pose. After a bound action is completed, the foot-ends respectively stand in different target unit regions. FIG. 11 is another flowchart of a motion control method for a legged robot according to an embodiment of the present disclosure. A description is provided in combination with steps shown in FIG. 11.

Step 401: The legged robot receives a bound instruction for the legged robot when foot-ends of the legged robot stand in a same initial unit region and the foot-ends converge in the initial unit region, the bound instruction being used for instructing the legged robot to bound to independent unit regions independent from one another from a current initial unit region, and the foot-ends being in a one-to-one correspondence with the independent unit regions. A distance between any two foot-ends when the legged robot is in the independent unit regions is greater than a distance between the two corresponding foot-ends when the legged robot is in the initial unit region.

Exemplarily, a distance between any two foot-ends of the legged robot before the bound is a third distance, and a distance between any two foot-ends after the legged robot bounds to the independent unit regions is a fourth distance. The third distance is less than the fourth distance. Exemplarily, the legged robot is a quadruped robot, including two front feet (a first foot and a second foot) and two rear feet (a third foot and a fourth foot). The four feet are all in the initial unit region before the bound, and the four foot-ends of the legged robot are respectively in the independent unit regions independent from one another after the bound. A distance between the first foot and the second foot after the bound is greater than a distance between the first foot and the second foot before the bound. A distance between the third foot and the fourth foot after the bound is greater than a distance between the third foot and the fourth foot before the bound. A distance between the first foot and the third foot after the bound is greater than a distance between the first foot and the third foot before the bound. A distance between the second foot and the fourth foot after the bound is greater than a distance between the second foot and the fourth foot before the bound.

Target unit regions may be located in front of the legged robot or discretely arranged by using the initial unit region as a center.

In a practical implementation, a terrain region in which the legged robot is located includes at least two unit regions (which are consistent with the unit regions in step 101). An initial state of the legged robot is that the foot-ends of the legged robot stand in the same initial unit region with the foot-ends converging in the initial unit region. It may be understood that the initial unit region may be a limited terrain region. When the foot-ends of the legged robot simultaneously stand in the region, the foot-ends usually stand at a pose of converging to a position below a center of mass of a body. The distance between any two foot-ends when the legged robot is in the independent unit regions is greater than the distance between the two corresponding foot-ends when the legged robot is in the initial unit region. Based on the received bound instruction (a manner in which the legged robot receives the bound instruction is as described above), the legged robot may control the legged robot to complete a first bound action with high dynamic performance and difficulty (different from the above bound action) in a terrain region in the form of a quincuncial pile pattern or a terrain region that may be discretized into quincuncial piles. The first bound action may be a bound function of the legged robot to end surface regions of single piles from the above initial state of standing in an end surface region of a single pile in the set of quincuncial piles. If a quadruped robot is used as an example, the bound action may be a bound function of the quadruped robot to four piles from a single pile on which four feet converge.

Step 402: Control the legged robot to bound to the independent unit regions in response to the bound instruction.

In a practical implementation, the legged robot performs a corresponding bound action in response to the bound instruction. Before performing the bound action, the legged robot can generate a reference bound trajectory corresponding to a current bound action by using an MPC method. The reference bound trajectory may include state parameters of at least two key points. Each phase corresponds to corresponding control information. The legged robot analyzes the control information to obtain a motion trajectory corresponding to each phase.

In some embodiments, the legged robot may bound to the independent unit regions located in front of the legged robot in the following phases: When the independent unit regions are located in front of the legged robot, the legged robot controls the legged robot to bound forward to the independent unit regions from the initial unit region through a take-off phase, a flight phase, and a landing phase in response to the bound instruction.

In a practical implementation, a process in which the legged robot bounds to the independent unit regions independent from one another from the initial unit region may include at least one of the take-off phase, the flight phase, and the landing phase. The legged robot obtains the control information of each key point based on the reference bound trajectory corresponding to the current bound instruction. The legged robot analyzes the control information to obtain a parameter value of the state parameter corresponding to each operation, thereby presenting a corresponding form.

Actions successively performed by the legged robot in the take-off phase of the bound process are described. In some embodiments, the take-off phase of the legged robot in the bound process may include the following actions: The legged robot successively performs actions of foot-end push-off and front foot-end leaving the ground.

In a practical implementation, in the take-off phase, the legged robot may obtain at least control information of the following key points in the reference bound trajectory: foot-end push-off and front foot-end leaving the ground (in this case, rear foot-ends still push off). In the take-off phase of the entire bound process, the legged robot successively performs the actions of foot-end push-off (the foot-ends perform the push-off action in the initial unit region) and front foot-end leaving the ground (rear feet still push off after the front feet leave the ground) from the initial state. For each action, the legged robot controls the legged robot to be in a state corresponding to the action based on the corresponding control information.

Figure 12:
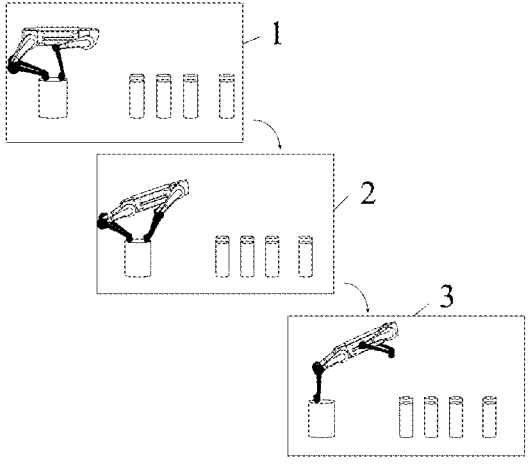
FIG. 12 is another schematic diagram of a take-off phase of a legged robot according to an embodiment of the present disclosure.

Exemplarily, FIG. 12 is another schematic diagram of a take-off phase of a legged robot according to an embodiment of the present disclosure. In the figure, the legged robot is a quadruped robot, and a unit region is a single pile in a set of quincuncial piles. No. 1 in the figure shows an initial state of the quadruped robot. No. 2 in the figure shows the foot-end push-off operation performed by the legged robot in the take-off phase of the bound process. No. 3 in the figure shows the operation of front foot-end leaving the ground performed by the legged robot in the take-off phase of the bound process.

In some embodiments, in the take-off phase of the legged robot, body parts of the legged robot may present the following changes of form: In a foot-end push-off process of the legged robot, the legged robot reduce joint angles of knee joints of rear legs, and increases joint angles of knee joints of front legs so that rear thighs are in a same straight line as a torso, the torso is lifted at a target pitch angle, and a center of mass is moved forward and upward.

In a practical implementation, the legged robot obtains first control information in a reference bound trajectory corresponding to a key point of foot-end push-off, analyzes the first control information, and adjusts a value of each state parameter to a reference value of each state parameter in the first control information. The foot-ends of the legged robot simultaneously push off based on the reference bound trajectory, so that the legged robot performs an accelerated motion forward and upward at a target pitch angle and based on a position of the center of mass.

Based on the above example, the legged robot is the quadruped robot, for example. Refer to the foot-end push-off operation performed by the legged robot shown by No. 2 in FIG. 12. Compared to the initial state shown by No. 1 in FIG. 12, during foot-end push-off, altitudes of knee joints are increased, the torso of the quadruped robot is in a straight line with the rear thighs, the joint angles of the knee joints of the front leg are close to 180°, and the torso is lifted at the target pitch angle.

In some embodiments, in a process of front foot-end leaving the ground of the legged robot (rear feet still push off after the front feet leave the ground), the legged robot reduces the joint angles of the knee joints of the front leg of the legged robot to a first target angle and increases the joint angles of the knee joints of the rear leg to a second target angle, to increase the altitudes of the knee joints and an altitude of the center of mass. The altitudes of the knee joints of the front legs are greater than the altitude of the center of mass, and the altitudes of the knee joints of the rear legs are less than the altitude of the center of mass. The first target angle indicates angles of the knee joints of the front legs when the front thighs of the legged robot are in a same straight line as the torso. The second target angle indicates angles of the knee joints of the rear legs when rear calves of the legged robot are perpendicular to a contact surface and the rear thighs are in a same straight line as the torso.

In a practical implementation, after the legged robot performs the foot-end push-off operation based on the reference bound trajectory, the legged robot performs the operation of front foot-end leaving the ground, upon which the rear foot-ends continue to push off. The legged robot obtains second control information in the reference bound trajectory corresponding to the key point of front foot-end leaving the ground, analyzes the second control information, and adjusts the value of each state parameter of the legged robot to a reference value of each state parameter in the second control information. The legged robot further performs an accelerated motion upward and forward for take-off based on a corresponding reference angle and position, and bends and contracts the front legs.

Based on the above example, the legged robot is the quadruped robot, for example. Refer to the operation of front foot-end leaving the ground performed by the legged robot shown by No. 3 in FIG. 12. Compared to the state during the foot-end push-off shown by No. 2 in FIG. 12, the center of mass is moved forward and upward, the front legs are bent and contracted, the rear calves are perpendicular to a pile surface of a single pile, the rear thighs are in the same straight line as the torso, and the torso is lifted at the target pitch angle.

Actions successively performed by the legged robot in a flight phase of the bound process are described. In some embodiments, in the flight phase, the legged robot performs an operation of rear foot-end leaving the ground. In a process of rear foot-end leaving the ground of the legged robot, the legged robot controls each front leg to stretch toward the corresponding independent unit region, and controls each rear leg to first contract and then stretch to the corresponding independent unit region, so that each foot-end of the legged robot can land in the corresponding independent unit region.

In a practical implementation, after the legged robot performs the operation of front foot-end leaving the ground based on the reference bound trajectory, the legged robot performs the operation of rear foot-end leaving the ground, upon which the legged robot starts flight. The legged robot obtains third control information in the reference bound trajectory corresponding to the key point of rear foot-end leaving the ground, analyzes the third control information, and adjusts the value of each state parameter of the legged robot to a reference value of each state parameter in the third control information, so that the legged robot flies completely, the front legs start to stretch toward positions of the independent unit regions corresponding to the corresponding foot-ends, and the rear legs first contract to provide a landing altitude for swinging feet and then start to stretch toward the positions of the independent unit regions corresponding to the corresponding foot-ends to prepare for landing.

Figure 13:
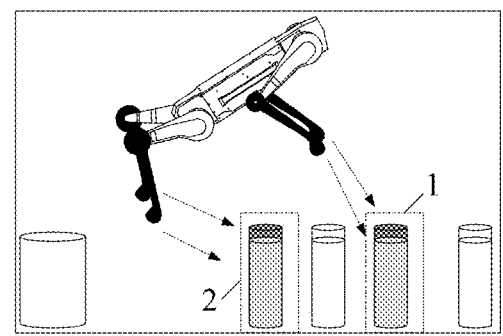
FIG. 13 is a schematic diagram of operations performed in a flight phase of a legged robot according to an embodiment of the present disclosure.

Based on the above example, the legged robot is the quadruped robot, for example. FIG. 13 is a schematic diagram of operations performed in a flight phase of a legged robot according to an embodiment of the present disclosure. In the flight phase, the legged robot performs an operation of rear foot-end leaving the ground. Compared to the state during the front foot-end leaving the ground shown by No. 3 in FIG. 12, the legged robot controls the rear foot-ends to stand on piles, and the legged robot flies completely. The front legs start to stretch toward positions of corresponding target single piles (single piles shown by No. 1 in the figure), and the rear legs first contract to provide the landing altitude for the swinging feet and then stretch toward positions of corresponding target single piles (single piles shown by No. 2 in the figure).

Operations successively performed by the legged robot in a landing phase of the bound process are described. In some embodiments, in the landing phase, the legged robot successively performs operations of foot-end landing, leg bending and cushioning, and body balancing.

In a practical implementation, in the landing phase, the legged robot can obtain at least control information of the following key points in a reference bound trajectory: foot-end landing, leg bending and cushioning, and body balancing. In the landing phase of the entire bound process, the legged robot successively performs the operations of foot-end landing, leg bending and cushioning, and body balancing. For each operation, the legged robot controls the legged robot to be in a state corresponding to the operation based on the corresponding control information.

Figure 14:
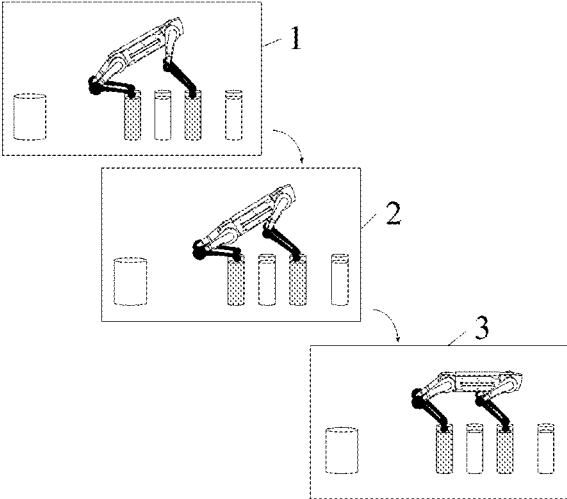
FIG. 14 is another schematic diagram of a landing phase of a legged robot according to an embodiment of the present disclosure.

Exemplarily, FIG. 14 is another schematic diagram of a landing phase of a legged robot according to an embodiment of the present disclosure. In the figure, the legged robot is a quadruped robot, and a unit region is a single pile in a set of quincuncial piles. No. 1 in the figure shows a foot-end landing operation performed by the quadruped robot. No. 2 in the figure shows a leg bending and cushioning operation performed by the legged robot. No. 3 in the figure shows a body balancing operation performed by the legged robot.

In some embodiments, in the landing phase, body parts of the legged robot may present the following changes of form: In a foot-end landing process of the legged robot, the legged robot controls the foot-ends to simultaneously contact surfaces in the corresponding independent unit regions. In a leg bending and cushioning process of the legged robot, the legged robot performs a leg bending action of bending and contracting the legs, and increases torques of joints of the legs, to reduce a velocity of the legged robot. In a body balancing process of the legged robot, the legged robot adjusts a body pose to move a center of mass of the legged robot to into a region range composed of the target unit regions.

In a practical implementation, the legged robot obtains fourth control information in a reference bound trajectory corresponding to a key point of foot-end landing, analyzes the fourth control information, and adjusts a value of each state parameter of the legged robot to a reference value of each state parameter in the fourth control information, so that the foot-ends of the legged robot simultaneously contact the contact surfaces of the corresponding independent unit regions. In this case, knee joints of front legs of the legged robot are still at a relatively large joint angle. A body of the legged robot is lifted at a target pitch angle, knee joints of rear legs are moved downward until the rear calves are approximately parallel to the contact surfaces, and the center of mass is shifted toward the rear legs, to prepare for subsequent leg bending and cushioning. The legged robot obtains fifth control information of a key point of leg bending and cushioning, and performs the leg bending and cushioning operation. The legged robot controls each leg to bend and contract and applies torque control to each joint simultaneously, and stably moves a projection of the center of mass of the body into a region defined by the four feet in a four-leg stance. In this case, a torso is lifted at the target pitch angle, rear thighs are stretched backward to be in a straight line as the torso, and the knee joints are lowered to be in a straight line as the contact surfaces of the corresponding target regions, to implement balance within the independent unit regions.

Based on the above example, the legged robot is the quadruped robot, for example. Refer to the foot-end landing operation performed by the legged robot shown by No. 1 in FIG. 14. Compared to the flight state of the legged robot in FIG. 13, the foot-ends of the quadruped robot simultaneously contact the pile surfaces, the knee joints of the rear legs are moved downward until the rear calves are approximately parallel to the contact surfaces, the center of mass is shifted toward the rear legs to prepare for subsequent leg bending and cushioning, and the torso is lifted at the target pitch angle. Refer to the leg bending and cushioning operation performed by the legged robot shown by No. 2 in the figure. Compared to the state shown by No. 1, the knee joints of the rear legs of the quadruped robot are further moved downward until the rear thighs are in the same straight line as the torso, the rear calves are approximately parallel to the contact surfaces, and the torso is lifted at the target pitch angle. Refer to the foot-end landing operation performed by the legged robot shown by No. 3 in the figure. Compared to the state shown by No. 2, the torso of the quadruped robot is parallel to the pile surfaces, the center of mass is shifted to a center of the torso, and the knee joints of the rear legs are raised to the same altitude as the knee joints of the front legs.

In a practical implementation, the legged robot can perform another continuous bound action. To be specific, when the foot-ends of the legged robot respectively stand in the unit regions independent from each other, a continuous and stable bound action of the legged robot may be implemented in combination with step 101 to step 102 and step 401 to step 402. In other words, the legged robot bounds to an intermediate unit region from the initial state in which the foot-ends respectively stand in the unit regions independent from each other through the above step 101 to step 102 (the foot-ends of the legged robot converge in the intermediate unit region), and then bounds to a plurality of intermediate unit regions with the same quantity as the foot-ends from a single intermediate unit region through the above step 401 to step 402.

Exemplarily, FIG. 15 is a schematic diagram of a continuous bound process of a legged robot according to an embodiment of the present disclosure. The continuous bound process includes a first bound and a second bound. The first bound is that a quadruped robot bounds to a single pile in the front from four single piles of a set of quincuncial piles, and the second bound is that the quadruped robot bounds to other four single piles from the single pile based on the first bound. The bound process of the first bound is consistent with the bound process shown in the above step 101 to step 102, and the bound process of the second bound is consistent with the bound process shown in the above step 401 to step 402. The two bound processes may be performed alternately and continuously, which is not limited in this embodiment of the present disclosure.

In a practical implementation, the legged robot can further continuously perform the bound action. To be specific, when the legged robot bounds to the target unit region from the initial unit region, a continuous and stable bound action of the legged robot may be implemented in combination with step 401 to step 402 and step 101 to step 102. In other words, the legged robot bounds to a plurality of intermediate unit regions of the same quantity as the foot-ends from the initial state in which the foot-ends stand in a same initial unit region with the foot-ends converging in the initial unit region through the above step 401 to step 402, and then bounds to one target unit region from the intermediate unit regions (in this case, each foot-end corresponds to one intermediate unit region) through the above step 101 to step 102.

Exemplarily, FIG. 16 is another schematic diagram of a continuous bound process of a legged robot according to an embodiment of the present disclosure. The continuous bound process includes a first bound and a second bound. The first bound is that a quadruped robot bounds to four single piles in the front from a single pile of a set of quincuncial piles, and the second bound is that the quadruped robot bounds to another single pile from the four single piles based on the first bound. The bound process of the first bound is consistent with the bound process shown in the above step 401 to step 402, and the bound process of the second bound is consistent with the bound process shown in the above step 101 to step 102. The two bound processes may be performed alternately and continuously, which is not limited in this embodiment of the present disclosure.

Through the control of the bound action of the legged robot implemented by using the embodiments of the present disclosure, and in combination with the constraint condition of the landing position, far and high takeoff, flight, and accurate landing are implemented, and actions of cushioning, balancing, and pose control are smoothly completed. In this way, the legged robot may be controlled to complete the bound action on various terrain regions such as a quincuncial pile set, block-shaped stepping stones, and a flat ground, to implement control of bounding to the limited region for the legged robot, and improve a precision of controlling the bound of the legged robot. In addition, a motion ability of the legged robot may be further expanded, and an excellent technique level of the legged robot in motion planning and control is presented. In addition, the bound action achieved by the legged robot in the embodiments of the present disclosure has advantages such as high dynamic performance and difficulty. Moreover, the legged robot has a bionic characteristic, which can improve the dynamic characteristic, the difficulty, and an ornamental value of the motions of the legged robot, and diversify the motions of the legged robot.

An exemplary application of this embodiment of the present disclosure in an actual application scenario is described below. In the application scenario, the legged robot is a quadruped robot, and the quadruped robot is located in a place with quincuncial piles. In the application scenario, an execution process of a bound action of the quadruped robot is as follows: The quadruped robot bounds to a target pile surface with a limited pile surface located in front of a body of the quadruped robot from small high piles in the set of quincuncial piles in which four foot-ends respectively stand. On the target pile surface, the quadruped robot stands in a state in which the four foot-ends converge to a position below the body and maintain balance.

In the related art, most bound actions that can be implemented by the quadruped robot are implemented as motions with continuous gaits (for example, bound or pronk) on a flat ground or a terrain with a large landing area, and no bound actions are implemented under a constraint condition of a limited landing point.

Due to discrete positions of four landing points, an area of a support projection region is increased. Therefore, the bound actions implemented on the flat ground or the terrain with the large landing area can achieve balance more easily. However, in the related art, for a case that the positions of the four landing points are limited, especially a case that the four landing points are required to converge to a position directly under the body, a bound action is implemented by using continuous trot gaits in-situ with low dynamic performance, and there is no follow-up action after landing. Currently, there is no related technical solution for converging four feet and completing actions of stable cushioning, balance maintenance, and pose control under conditions such as strong landing impact and limited landing positions in combination with bound actions (pronk or bound) with high dynamic performance.

Based on the above, an embodiment of the present disclosure provides a motion control method for a legged robot. The method is applicable to a scenario in which a legged robot bounds on quincuncial piles, and can implement the following: A quadruped robot performs pronk from a normal standing pose to achieve flight, then converges four feet, smoothly lands in a specific small region (a single quincuncial pile surface) and maintains balance, and completes head shaking and fishtailing actions in-situ at a target pose.

In a practical implementation, the actions are designed based on the quadruped robot. A most challenging scenario of a quincuncial pile set is used as an example for description of actions. As shown in FIG. 4, a terrain region shown in the figure includes quincuncial piles, and pile surfaces in the quincuncial piles may be regarded as unit regions independent from one another in the terrain region. The quadruped robot is controlled to implement a bound action in the current scenario on the quincuncial piles. The entire bound process may be divided into a take-off phase, a flight phase, and a landing phase. The three phases are successively described below.

In the take-off phase of the bound process, the quadruped robot successively undergoes the following changes of state: initial state→crouching→starting foot-end push-off→starting flight. When the quadruped robot is in the initial state, four foot-ends of the quadruped robot stand on four pile surfaces in a normal standing pose (refer to the state of the quadruped robot shown by No. 1 in FIG. 7). When receiving a bound instruction, the quadruped robot actively lowers a body to a planned take-off altitude (that is, performs the crouching action) (refer to the state of the quadruped robot shown by No. 2 in FIG. 7). When the quadruped robot is in the crouching state, the four feet of the quadruped robot simultaneously push off according to a reference joint trajectory (a pre-planned motion trajectory for hip joints and knee joints) outputted in a planning phase. The quadruped robot lifts a head at a specific body pitch angle (refer to the crouching state shown by No. 3 in FIG. 7), then controls joint angles of the knee joints to increase (an acute angle facing forward is gradually increased to a an obtuse angle facing forward), controls an altitude of a center of mass of the body to increase, and performs an accelerated motion forward and upward for takeoff (that is, starts flight) (refer to the flight state shown by No. 4 in FIG. 7).

In the flight phase of the bound process, the quadruped robot successively undergoes the following changes of state: flight, four feet convergence, and leg contraction→flight, four feet convergence, and leg stretching. The four feet of the quadruped robot completely leave the ground, so that the robot flies completely. In the air, the quadruped robot converges the four feet and contracts the legs (refer to the state shown by No. 1 in FIG. 8). To be specific, the quadruped robot controls the four feet to converge to a position under the center of mass of the body, and contracts the legs upward (joint angles of the knee joints are reduced), and then converges the four feet and stretches the legs (refer to the state shown by No. 2 in FIG. 8). That is to say, the quadruped robot further stretches forward and downward toward a landing point (which is planned) when the four legs are converged, to prepare for landing.

In the landing phase of the bound process, the quadruped robot successively undergoes the following changes of state: contact with the pile surface→leg bending and cushioning→balance maintenance. The four feet of the quadruped robot simultaneously contact the pile surface (refer to the state shown by No. 1 in FIG. 9), then the four legs start to bend and contract and torque control is simultaneously applied to each joint for cushioning and deceleration (refer to the state shown by No. 2 in FIG. 9), and a projection of the center of mass of the body is smoothly moved into a region defined by the four feet in a four-leg stance (refer to the state shown by No. 3 in FIG. 9), thereby finally implementing balance. Due to a relatively large distance by which rear legs stretch forward (stretching distances of the knee joints and the hip joints of the rear legs are large) during contact with the pile surface and configuration of a degree of freedom of the legs of the quadruped robot, the knee joints of the rear legs tend to move downward during cushioning after landing. In addition, to avoid collisions between calves of the rear legs and an edge of the pile surface after the knee joints descend to be lower than the target pile surface, or to avoid collisions between the knee joints and the ground in another terrain such as a flat ground, a bending and contraction degree of the rear legs and a descent degree of the knee joints of the rear legs need to be limited during control of the cushioning motion. In addition, it needs to be ensured that the foot-ends neither rebound as a result of impact after contacting the pile surfaces, nor slide as a result of the poses and the forces of the legs.

In a practical application, the quadruped robot completes the bound action toward the target pile surface through the above three phases of the bound process, and maintains balance on the target pile surface at a pose with the four feet being converged below the body.

In a practical implementation, when the quadruped robot is in a balanced state on the target pile surface (a state of standing at a small landing point distance), the quadruped robot can further receive an instruction for controlling the quadruped robot to perform head shaking and fishtailing. The pose of the body of the quadruped robot is controlled on the target pile surface in the current balanced pose, to perform a single motion and combined motions along at least one of three degrees of freedom: a roll (refer to No. 1 in FIG. 10), a pitch (refer to No. 3 in FIG. 10), and a yaw (refer to No. 2 in FIG. 10), to implement the bionic actions of head shaking and fishtailing.

The quadruped robot completes the entire bound action on various terrains such as the quincuncial piles, which can expand a motion ability of the legged robot, and present an excellent technique level of the legged robot in motion planning and control.

Next, the motion control method for a legged robot provided in the embodiments of the present disclosure is described from a technique side. In a technical implementation, in this embodiment of the present disclosure, a most labor-saving bound trajectory is planned by using a nonlinear optimization method, and motion control is performed based on the MPC, to implement a complete set of bound actions with high dynamic performance and difficulty including crouching, push-off, four feet convergence, touchdown at a small landing point distance, cushioning, balancing, and head shaking and fishtailing performed by the quadruped robot from a normal standing pose. In the entire bound process of the current scenario, functional modules of the quadruped robot that implement the current bound action mainly include a bound trajectory planning module, a bound control module, and a terrain sensing module.

Operations performed by the bound trajectory planning module are described in detail first. The entire set of bound actions requires a specific forward bound distance and a specific upward bound altitude, and requires cushioning and balance in a very short time after landing, and therefore has an extremely high requirement on an outputted torque of a joint motor. FIG. 17 is a schematic diagram of a planar model of a quadruped robot according to an embodiment of the present disclosure. Based on the planar model of the quadruped robot shown in the figure, generalized coordinates are defined as:

$$q = [x, z, \text{pitch}, q_{hip,front}, q_{knee,front}, q_{hip,hind}, q_{knee,hind}]^T$$

x indicates a component of a center of mass along an X axis, z indicates a component of the center of mass along a Z axis, pitch indicates a pitch angle of the center of mass, $q_{hip,front}$ indicates a joint angle of a hip joint of a front leg, $q_{knee,front}$ indicates a joint angle of a knee joint of the front leg, $q_{hip,hind}$ indicates a joint angle of a hip joint of a rear leg, and $q_{knee,hind}$ indicates a joint angle of a knee joint of the rear leg. A nonlinear optimization problem shown below is constructed to plan an action trajectory, with an optimization goal being to minimize a total sum of driving forces required for completing the entire set of actions:

$$\min_f \sum_{i=1}^{k} f_i^T W f_i \tag{1}$$

s.t.

$$f_{min} \le f_i \le f_{max},$$

$$|f_{i,x}| \le \mu f_{i,z}, \tag{2}$$

$$0 \le p_{hip,z}, 0 \le p_{knee,z}, \tag{3}$$

$$\begin{bmatrix} H & -J_{front}^T & -J_{hind}^T \\ J_{front} & 0 & 0 \\ J_{hind} & 0 & 0 \end{bmatrix} \begin{bmatrix} \ddot{q} \\ f_{front} \\ f_{hind} \end{bmatrix} = \begin{bmatrix} S^T \tau - C\dot{q} - G \\ -\dot{J}_{front}\dot{q} \\ -\dot{J}_{hind}\dot{q} \end{bmatrix} \tag{4}$$

$f_i$ is contact force vectors of all foot-ends at an $i^{th}$ sampling point, W is a weight parameter matrix, and k is a quantity of action sampling points. Constraint conditions include: (1) a joint torque limit and a contact force limit, (2) a foot-end friction cone, (3) the hip joints and the knee joints are higher than a pile surface, and (4) a dynamics constraint and no sliding at the foot-ends. $f_{min}, f_{max}$ are respectively a minimum value and a maximum value of a contact force, $f_{i,x}, f_{i,z}$ are respectively components of the contact force at the $i^{th}$ sampling point in the X axis direction and the Z axis direction, $\mu$ is a friction coefficient, $p_{hip,z}, p_{knee,z}$ are respectively altitudes of a hip joint and a knee joint, H, S, C, G are respectively a generalized mass matrix, a selection matrix, a friction-Coriolis force correlation matrix, and a gravity term matrix, and $J_{front}, J_{hind}$ are respectively Jacobian matrixes of the front leg and the rear leg. A first row in the constraint condition (4) indicates the dynamics constraint, and a second row and a third row respectively indicate no sliding at front feet and rear feet in the contacted state.

To accelerate the optimization problem solving and make the trajectories of actions of final products as close as possible to those designed, generalized coordinate sampling points at action phases need to be provided. Sampling points of the generalized coordinates are successively an initial state $q_{start}$, a state at a moment when four feet leave piles $q_{lift-off}$, a state at a moment when four feet lands on a single pile $q_{touchdown}$, and a state of standing on a single pile $q_{end}$. A unique point of the actions is that the four feet converge and land on the single pile, and the corresponding sampling point is provided in the following form:

$$q_{touchdown} = [x_{pole} + x_{offset}, z_{pole} + z_{offset}, pitch_{touchdown},$$

$$IK(p_{pole} + p_{offset,front}), IK(p_{pole} + p_{offset,hind})]^T,$$

A reference position of a center of mass is provided based on a position $(x_{pole}, z_{pole})$ of the single pile and a specific offset $(x_{offset}, z_{offset})$ based on an action design. A reference pitch angle $pitch_{touchdown}$ of a body is also provided based on the action design. $p_{pole} + p_{offset,front/hind}$ indicates a desired landing point of each foot on a pile, that is, is based on a center position $p_{pole}$ of a pile surface and a convergence offset $p_{offset,front/hind}$ of each foot. A reference joint angle of a leg is calculated through inverse kinematics (IK ($\square$)) based on the desired landing point on the pile and the reference position of the center of mass. Through setting of $p_{offset,front}$ and $p_{offset,hind}$, a landing position for converging the four feet during landing on the pile may be adjusted.

The optimization problem is solved based on the above manner to obtain the most labor-saving reference bound trajectory that satisfies the constraint conditions. The reference bound trajectory may effectively ensure feasibility of the entire set of bound actions, so that the bound control module can successfully predict the reference trajectory. Head shaking and fishtailing actions after a balance is completed can be implemented through pre-programming or online remote control instructions.

Next, a technical implementation of the bound control module is described. For the take-off phase, because the real machine conforms to a theoretical planar model, a joint reference torque $\tau_{ref}$ in an optimal reference trajectory may be directly used as a feedforward torque $\tau_{feedforward}$, and a PD control feedback torque $\tau_{feedback}$ may be calculated based on a joint reference angle $q_{ref}$ and an angular velocity $\dot{q}_{ref}$, thereby implementing determination and prediction of the take-off action, that is:

$$\tau_{command} = \tau_{feedforward} + \tau_{feedback} = \tau_{ref} + k_p(q_{ref} - q) + k_d(\dot{q}_{ref} - \dot{q})$$

$k_p, k_d$ are respectively PD gains.

Control of leg actions is implemented through only joint PD control in a flight phase. Because the four legs on the real machine converge toward a sagittal plane of the body in a lateral direction of the body after landing, the real machine does not conform to the planar model, and therefore the optimal joint reference torque cannot be directly obtained. In addition, because errors exist in the pose, the position, and a landing time of the body in the flight phase compared to the reference trajectory, cushioning, balancing, and subsequent head shaking and fishtailing are implemented through the MPC controller. An MPC optimization problem is constructed based on the planned optimal reference trajectory and a current state of the robot, and is solved to obtain an optimal joint torque.

Operations performed by the terrain sensing module are described in detail finally. The entire set of actions may be implemented with or without the terrain sensing module. When the terrain sensing module is arranged, online trajectory planning is performed based on identification and positioning information, that is, $p_{pole}$ of an independent single pile. When the terrain sensing module is not arranged, prediction and determination may be performed based on an offline planned action trajectory, provided that prior knowledge about a terrain is available.

Because the flight phase exists, in which an actual flight time and flight trajectory both may have specific errors compared to the planned reference trajectory, an actual landing moment may be different from a planned moment. Without a foot-end touchdown sensing ability, the quadruped robot cannot switch MPC force control in a timely manner, resulting in problems such as foot-end collisions and rebound and sliding on the pile surfaces. In this embodiment of the present disclosure, a foot-end contact force is calculated based on the joint torque, and then it is determined through the force on the sole whether the feet contact the pile surface, thereby providing timely sensing information for control of algorithm switching. A calculation formula is as follows:

$$f = J^{-T}\tau$$

$$b_{contact} = \begin{cases} 1, \text{ if } f_{normal} \geq f_{threshold}, \\ 0, \text{ else} \end{cases}$$

$b_{contact}$ indicates a sole contact state of a boolean type, $f_{normal}$ is a component of the sole contact force in a normal direction of the contact surface, and $f_{threshold}$ is a threshold for determining contact or not. A determination logic for the force on the sole is that if the component of the sole contact force in the normal direction of the contact surface is greater than the threshold that is provided, a contact state (1) is determined, or otherwise, a non-contact state (0) is determined.

The bound action may be pronk or bound. The bound may be divided into four phases: a crouching phase, a four-feet push-off phase, a rear leg stance phase, and a flight phase. In addition to nonlinear optimization, the trajectory planning algorithm may further be other simple methods such as heuristic and spline interpolation, which can implement similar actions in spite of a possibility of failing to ensuring trajectory optimality. In addition to the MPC, the control method can further implement motion prediction based on a QP controller.

According to the embodiments of the present disclosure, the bound action is completed, which improves dynamic performance, difficulty, and an ornamental value of the motions of the quadruped robot, and diversifies the motions of the quadruped robot, so that the quadruped robot can display actions with high difficulty not only on a flat ground, but also in a scenario such as quincuncial piles and small stone piers.

An exemplary structure of the motion control apparatus 555 for a legged robot provided in the embodiments of the present disclosure implemented as a software module is further described below. In some embodiments, the legged robot includes at least two foot-ends, as shown in FIG. 2. Software modules stored in the motion control apparatus 555 for a legged robot of the memory 550 may include:

a receiving module, configured to receive a bound instruction for the legged robot when the foot-ends of the legged robot stand in unit regions independent from one another, the bound instruction being used for instructing the legged robot to bound to a target unit region from at least two unit regions in which the legged robot is currently located; and a control module, configured to control the legged robot to bound to the target unit region in response to the bound instruction, a distance between any two foot-ends of the legged robot in the target unit region being less than a distance between the two corresponding foot-ends before the bound.

In some embodiments, the target unit region is located in front of the legged robot. The control module is further configured to control the legged robot to bound forward to the target unit region through a take-off phase, a flight phase, and a landing phase in response to the bound instruction.

In some embodiments, the control module is further configured to: control the legged robot to successively performs operations of crouching, foot-end push-off, and starting flight in the take-off stage; control the legged robot to successively perform operations of foot and leg contraction in the air and leg stretching in the air in the flight phase; and control the legged robot to successively perform operations of foot-end landing, leg bending and cushioning, and body balancing in the landing phase.

In some embodiments, the control module is further configured to: control legs of the legged robot to be bent, and a center of mass of the legged robot to be lowered from an initial altitude to a take-off altitude in a crouching process of the legged robot; control the legged robot to increase a torque of each leg joint to increase a friction between each foot-end of the legged robot and a foot-end contact surface in a foot-end push-off process of the legged robot; and control the legged robot to perform a take-off action forward and upward at a target pitch angle to increase an altitude of each knee joint and an altitude of the center of mass in a flight process of the legged robot, the altitude of the center of mass being greater than the initial altitude.

In some embodiments, the control module is further configured to: control the legged robot to control each leg to drive the corresponding foot-end to converge upward to a position below a center of the body in a foot and leg contraction process of the legged robot in the air; and control the legged robot to control a front leg to stretch toward the target unit region to enable each foot-end of the legged robot to land on the target unit region in a leg stretching process of the legged robot in the air.

In some embodiments, the control module is further configured to: control the legged robot to control the foot-ends of the legged robot simultaneously contact a contact surface in the target unit region in a foot-end landing process of the legged robot; control the legged robot to perform a leg bending action of bending and contracting the legs and increase torques of joints of the legs to reduce a speed of the legged robot in a leg bending and cushioning process of the legged robot; and control the legged robot to adjust a body pose to move a center of mass of the legged robot to the target unit region in a body balancing process of the legged robot.

In some embodiments, the legged robot includes a tail. The control module is further configured to control the legged robot to continuously perform at least one of a head shaking action and a fishtailing action in the target unit region based on at least one degree of freedom, the degree of freedom including at least one of a roll, a pitch, and a yaw.

In some embodiments, the target unit region is located at a center of the unit regions in which the foot-ends are located. The control module is further configured to control the legged robot to bound upward to the target unit region through a take-off phase, a flight phase, and a landing phase in response to the bound instruction.

In some embodiments, the control module is further configured to: control the legged robot to successively performs operations of crouching and starting flight in the take-off phase; control the legged robot to perform an operation of foot and leg contraction in the air in the flight phase; and control the legged robot to successively perform operations of foot-end landing, leg bending and cushioning, and body balancing in the landing phase.

In some embodiments, the control module is further configured to: control legs of the legged robot to be bent, and a center of mass of the legged robot to be lowered from an initial altitude to a take-off altitude in a crouching process of the legged robot; control the legged robot to bound upward to increase an altitude of each knee joint and an altitude of the center of mass in a flight process of the legged robot, the altitude of the center of mass is greater than the initial altitude; and control the legged robot to control a torso to be in an upright state, and control each leg of the legged robot to drive the corresponding foot-end to converge upward to a position below the torso in a foot and leg contraction process of the legged robot in the air.

In some embodiments, the legged robot is a quadruped robot. The control module is further configured to control, in response to the bound instruction, the legged robot to bound to the target unit region by using two front legs and two rear legs alternately when the bound instruction instructs to perform bound.

In some embodiments, a process in which the control module is further configured to control the legged robot to bound to the target unit region by using the two front legs and the two rear legs alternately includes a crouching phase, a four-feet push-off phase, a rear leg stance phase, a flight phase, and a landing phase.

In some embodiments, the unit regions and the target unit region each are an end surface region of a single pile in a set of quincuncial piles, and a shape and a size of each unit region are the same as a shape and a size of the target unit region.

In some embodiments, the control module is further configured to predict a bound trajectory of the legged robot, and obtain a reference bound trajectory; obtain a constraint condition corresponding to the bound instruction, the constraint condition being used for constraining the bound of the legged robot; and determine state parameters of at least two key points in the reference bound trajectory based on the reference bound trajectory and the constraint condition. Correspondingly, the control module is further configured to control the legged robot to bound to the target unit region based on the state parameters of the key points in response to the bound instruction.

In some embodiments, the control module is further configured to obtain the at least two key points in the reference bound trajectory, the key points including at least one of the following: a start point of the reference bound trajectory, a vertex of the reference bound trajectory, and an end point of the reference bound trajectory.

An embodiment of the present disclosure provides a computer program product or a computer program, the computer program product or the computer program including computer instructions, the computer instructions being stored in a computer-readable storage medium. A processor of a computer device reads the computer instructions from a computer-readable storage medium, and the processor executes the computer instructions, so that the computer device performs the above motion control method for a legged robot in the embodiments of the present disclosure.

An embodiment of the present disclosure provides a computer-readable storage medium having executable instructions stored therein, the executable instructions, when executed by a processor, causing the processor to perform the motion control method for a legged robot provided in the embodiments of the present disclosure, for example, the motion control method for a legged robot shown in FIG. 3A to FIG. 3B.

In some embodiments, the computer-readable storage medium may be a memory such as a ROM, a RAM, an erasable programmable read-only memory (EPROM), an electrically erasable programmable read-only memory (EE-PROM), a flash memory, a magnetic surface memory, a compact disc, or a CD-ROM, or may be various devices including one of or any combination of the above memories.

In some embodiments, the executable instructions may adopt any form such as a program, a software, a software module, a script, or a code, may be written in a programming language of any form (including a compiled or interpreted language, or a declarative or procedural language), and may be deployed in any form, for example, deployed as a standalone program or as a module, a component, a subroutine, or another unit suitable for use in a computing environment.

In an example, the executable instructions may but may not necessarily correspond to files in a file system, may be stored in a part of the file for storing other programs or data, for example, stored in one or more scripts in a hyper text markup language (HTML), stored in a single file specially used for the discussed program, or stored in a plurality of collaborative files (for example, files storing one or more modules, a subprogram, or a code part).

As used herein, the term module (and other similar terms such as submodule, unit, subunit, etc.) in the present disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

In an example, the executable instructions may be deployed to be executed on one computing device, on a plurality of computing devices located at one site, or on a plurality of computing devices distributed at a plurality of locations and connected by a communication network.

In summary, according to the embodiments of the present disclosure, dynamic performance, difficulty, and an ornamental value of the motions of the quadruped robot are improved, and the motions of the quadruped robot are diversified, so that the quadruped robot may display actions with high difficulty not only on a flat ground, but also in a scenario such as quincuncial piles and small stone piers.

The above descriptions are merely the embodiments of the present disclosure and are not intended to limit the protection scope of the present disclosure. Any modification, equivalent replacement, or improvement made without departing from the spirit and principle of the present disclosure falls within the protection scope of the present disclosure.

What is claimed is:

1. A motion control method for a legged robot, performed by a control device, the legged robot comprising at least two foot-ends, and the method comprising:

receiving a bound instruction for the legged robot in response to the foot-ends of the legged robot standing in unit regions that are independent from one another, the bound instruction being used for instructing the legged robot to bound to a target unit region from at least two unit regions in which the legged robot is currently located; and controlling the legged robot to bound to the target unit region in response to the bound instruction, a distance between any two foot-ends of the legged robot in the target unit region being less than a distance between two corresponding foot-ends before bounding, wherein each of the unit regions and the target unit region includes an end surface region of a single pile in a set of quincuncial piles, and a shape and a size of each unit region are same as a shape and a size of the target unit region, respectively.

2. The method according to claim 1, wherein the target unit region is located in front of the legged robot, and controlling the legged robot to bound to the target unit region in response to the bound instruction comprises:

controlling the legged robot to bound forward to the target unit region through a take-off phase, a flight phase, and a landing phase in response to the bound instruction.

3. The method according to claim 2, wherein in the take-off phase, the legged robot successively performs actions of crouching, foot-end push-off, and starting flight;

in the flight phase, the legged robot successively performs actions of foot and leg contraction in air and leg stretching in the air; and in the landing phase, the legged robot successively performs actions of foot-end landing, leg bending and cushioning, and body balancing.

4. The method according to claim 3, wherein in a crouching process of the legged robot, legs of the legged robot are bent, and a center of mass of the legged robot is lowered from an initial altitude to a take-off altitude;

in a foot-end push-off process of the legged robot, the legged robot increases a torque of a joint of each leg, a magnitude of the torque being positively correlated with a magnitude of a friction, and the friction being a friction between each foot-end of the legged robot and a foot-end contact surface; and in a flight process of the legged robot, the legged robot performs a take-off action forward and upward at a target pitch angle, a magnitude of the target pitch angle being designed to increase an altitude of each knee joint and an altitude of the center of mass, and the altitude of the center of mass being greater than the initial altitude.

5. The method according to claim 3, wherein the legged robot is a quadruped robot;

in a foot and leg contraction process of the legged robot in the air, each leg of the legged robot drives the corresponding foot-end to converge upward to a position below a center of a body; and in a leg stretching process of the legged robot in the air, a front leg of the legged robot stretches toward the target unit region, a stretching degree of the front leg of the legged robot enabling each foot-end of the legged robot to land on the target unit region.

6. The method according to claim 3, wherein in a foot-end landing process of the legged robot, the foot-ends of the legged robot simultaneously contact a contact surface in the target unit region;

in a leg bending and cushioning process of the legged robot, legs of the legged robot are bent and contracted, torques of joints of the legs are increased, and a velocity of the legged robot is reduced; and in a body balancing process of the legged robot, the legged robot adjusts a body pose to move a center of mass of the legged robot to the target unit region.

7. The method according to claim 1, wherein the legged robot comprises a tail, and the method further comprises:

controlling the legged robot to continuously perform at least one of a head shaking action and a fishtailing action in the target unit region based on at least one degree of freedom, the degree of freedom comprising at least one of a roll, a pitch, and a yaw.

8. The method according to claim 1, wherein the target unit region is located at a center of the unit regions in which the foot-ends are located, and controlling the legged robot to bound to the target unit region in response to the bound instruction comprises:

controlling the legged robot to bound upward and land to the target unit region through a take-off phase, a flight phase, and a landing phase in response to the bound instruction.

9. The method according to claim 8, wherein in the take-off phase, the legged robot successively performs actions of crouching and starting flight;

in the flight phase, the legged robot performs an action of foot and leg contraction in the air; and in the landing phase, the legged robot successively performs actions of foot-end landing, leg bending and cushioning, and body balancing.

10. The method according to claim 9, wherein in a crouching process of the legged robot, legs of the legged robot are bent, and a center of mass of the legged robot is lowered from an initial altitude to a take-off altitude;

in a flight process of the legged robot, the legged robot bounds upward, the bound being configured to increase an altitude of each knee joint and an altitude of the center of mass, and the altitude of the center of mass being greater than the initial altitude; and in a foot and leg contraction process of the legged robot in the air, a torso of the legged robot is in an upright state, and each leg of the legged robot drives the corresponding foot-end to converge upward to a position below the torso.

11. The method according to claim 1, wherein the legged robot is a quadruped robot, and controlling the legged robot to bound to the target unit region in response to the bound instruction comprises:

controlling, in response to the bound instruction, the legged robot to bound to the target unit region by using two front legs and two rear legs alternately when the bound instruction instructs to perform bound.

12. The method according to claim 11, wherein a bounding process of the legged robot by using the two front legs and the two rear legs alternately comprises: a crouching phase, a four-feet push-off phase, a rear leg stance phase, a flight phase, and a landing phase.

13. The method according to claim 1, further comprising: predicting a bound trajectory of the legged robot, to obtain a reference bound trajectory;

obtaining a constraint condition corresponding to the bound instruction, the constraint condition being used for constraining the bound of the legged robot; and determining state parameters of at least two key points in the reference bound trajectory based on the reference bound trajectory and the constraint condition; and the controlling the legged robot to bound to the target unit region in response to the bound instruction comprises:

controlling the legged robot to bound to the target unit region based on the state parameters of the key points in response to the bound instruction.

14. The method according to claim 13, further comprising:

obtaining the at least two key points in the reference bound trajectory, the key points comprising at least one of following:

a start point of the reference bound trajectory, a vertex of the reference bound trajectory, and an end point of the reference bound trajectory.

15. A legged robot, comprising:

a robot body having at least two foot-ends; and a controller, arranged on the robot body and configured to perform the motion control method for the legged robot according claim 1.

16. A controller for a legged robot, the legged robot comprising at least two foot-ends, and the controller comprising:

one or more processors; and one or more memories, storing a computer-executable program that, when being executed, causes the one or more processors to perform a motion control method, the method comprising:

receiving a bound instruction for the legged robot in response to the foot-ends of the legged robot standing in unit regions that are independent from each other, the bound instruction being used for instructing the legged robot to bound to a target unit region from at least two unit regions in which the legged robot is currently located; and controlling the legged robot to bound to the target unit region in response to the bound instruction, a distance between any two foot-ends of the legged robot in the target unit region being less than a distance between two corresponding foot-ends before bounding, wherein each of the unit regions and the target unit region includes an end surface region of a single pile in a set of quincuncial piles, and a shape and a size of each unit region are same as a shape and a size of the target unit region, respectively.

17. The controller according to claim 16, wherein the target unit region is located in front of the legged robot, and the legged robot is controlled to bound forward to the target unit region through a take-off phase, a flight phase, and a landing phase in response to the bound instruction.

18. The controller according to claim 16, wherein the legged robot comprises a tail, and the legged robot is controlled to continuously perform at least one of a head shaking action and a fishtailing action in the target unit region based on at least one degree of freedom, and the degree of freedom comprising at least one of a roll, a pitch, and a yaw.

19. A non-transitory computer-readable storage medium, storing computer-executable instructions that, when being executed, causes one or more processors to perform a motion control method, the method comprising:

receiving a bound instruction for the legged robot in response to the foot-ends of the legged robot standing in unit regions that are independent from each other, the bound instruction being used for instructing the legged robot to bound to a target unit region from at least two unit regions in which the legged robot is currently located; and controlling the legged robot to bound to the target unit region in response to the bound instruction, a distance between any two foot-ends of the legged robot in the target unit region being less than a distance between two corresponding foot-ends before bounding, wherein each of the unit regions and the target unit region includes an end surface region of a single pile in a set of quincuncial piles, and a shape and a size of each unit region are same as a shape and a size of the target unit region, respectively.

* * * * *